United States Patent
Kim et al.

(10) Patent No.: US 10,854,215 B2
(45) Date of Patent: Dec. 1, 2020

(54) RESIDUAL ECHO ESTIMATOR TO ESTIMATE RESIDUAL ECHO BASED ON TIME CORRELATION, NON-TRANSITORY COMPUTER-READABLE MEDIUM STORING PROGRAM CODE TO ESTIMATE RESIDUAL ECHO, AND APPLICATION PROCESSOR

(71) Applicant: Samsung Electronics Co., Ltd., Suwon-si (KR)

(72) Inventors: Seongwoo Kim, Seongnam-si (KR); Han Young Yim, Suwon-si (KR); Dongil Hyun, Incheon (KR); Jong Won Shin, Gwangju (KR); Hyungchan Song, Daejeon (KR)

(73) Assignees: Samsung Electronics Co., Ltd., Gyeonggi-do (KR); Gwangju Institute of Science and Technology, Gwangju (KR)

( * ) Notice: Subject to any disclaimer, the term of this patent is extended or adjusted under 35 U.S.C. 154(b) by 0 days.

(21) Appl. No.: 16/546,532

(22) Filed: Aug. 21, 2019

(65) Prior Publication Data
US 2020/0243104 A1    Jul. 30, 2020

(30) Foreign Application Priority Data
Jan. 29, 2019   (KR) .................. 10-2019-0011091

(51) Int. Cl.
*G10L 21/02*   (2013.01)
*G10L 21/0216*   (2013.01)
(Continued)

(52) U.S. Cl.
CPC .......... *G10L 21/0216* (2013.01); *H04R 3/04* (2013.01); *G10L 2021/02082* (2013.01)

(58) Field of Classification Search
CPC . G10L 21/02; G10L 21/0216; G10L 21/0308; H04R 3/04
(Continued)

(56) References Cited

U.S. PATENT DOCUMENTS 6,925,176 B2    8/2005    Myllyla et al.
7,773,743 B2    8/2010    Stokes et al.
(Continued)

FOREIGN PATENT DOCUMENTS

| KR | 10-1033336 | 5/2011 |
| KR | 10-1573121 | 12/2015 |
| KR | 10-2017-0052056 A | 5/2017 |

OTHER PUBLICATIONS

Diego A. Bendersky et al., Nonlinear Residual Acoustic Echo Suppression for High Levels of Harmonic Distortion, 2008 IEEE International Conference on Acoustics, Speech and Signal Processing.

*Primary Examiner* — Melur Ramakrishnaiah
(74) *Attorney, Agent, or Firm* — Harness, Dickey and Pierce, P.L.C.

(57) ABSTRACT

A residual echo estimator estimates a residual echo of a microphone signal input to a microphone as a reference signal is output through a speaker. The residual echo estimator estimates a magnitude of a residual echo of the reference signal at a current frame by using a magnitude of the linear echo of the reference signal at the current frame and a magnitude of the linear echo of the reference signal at a past frame, and updates weights to be applied to the magnitudes of the linear echo.

19 Claims, 12 Drawing Sheets

(51) Int. Cl.
*H04R 3/04* (2006.01)
*G10L 21/0208* (2013.01)

(58) Field of Classification Search
USPC ............... 381/94.1, 94.2, 71.12, 71.1, 71.11; 379/406.01, 408.06
See application file for complete search history.

(56) References Cited

U.S. PATENT DOCUMENTS

| | | |
|---|---|---|
| 8,213,598 B2 | 7/2012 | Bendersky et al. |
| 9,172,816 B2 | 10/2015 | Ahgren |
| 9,595,997 B1* | 3/2017 | Yang .................. G10L 21/0208 |
| 9,699,552 B2 | 7/2017 | Kuech et al. |
| 10,056,092 B2 | 8/2018 | Buck et al. |
| 2016/0006480 A1* | 1/2016 | Tan ....................... H04B 3/234 379/32.01 |
| 2018/0040333 A1* | 2/2018 | Wung ................. G10L 21/0232 |

* cited by examiner

RESIDUAL ECHO ESTIMATOR TO ESTIMATE RESIDUAL ECHO BASED ON TIME CORRELATION, NON-TRANSITORY COMPUTER-READABLE MEDIUM STORING PROGRAM CODE TO ESTIMATE RESIDUAL ECHO, AND APPLICATION PROCESSOR

CROSS-REFERENCE TO RELATED APPLICATIONS

This application claims priority under 35 U.S.C. § 119 to Korean Patent Application No. 10-2019-0011091 filed on Jan. 29, 2019, in the Korean Intellectual Property Office, the disclosure of which is incorporated by reference herein in its entireties.

BACKGROUND

Example embodiments of the inventive concepts described herein relate to a residual echo estimator configured to estimate a residual echo based on time correlation, a non-transitory computer-readable medium storing a program code configured to estimate a residual echo, and/or an application processor.

In an electronic device including a speaker and a microphone, as a voice of a far-end speaker is output through the speaker, the voice of the far-end speaker may be input to the microphone. This acoustic echo may make it difficult to recognize a voice of a near-end speaker at a far end. Accordingly it may be desirable to cancel the acoustic echo due to the coupling between the speaker and the microphone positioned adjacent to each other. Also, as a demand on an electronic device supporting voice recognition increases, it may be more important to effectively cancel the acoustic echo.

SUMMARY

Example embodiments of the inventive concepts provide a residual echo estimator configured to estimate a residual echo based on time correlation, a non-transitory computer-readable medium storing a program code configured to estimate a residual echo, and an application processor.

According to an example embodiment, a residual echo estimator is configured to estimate a residual echo of a microphone signal. In some example embodiments, the residual echo estimator includes processing circuitry configured to, estimate a magnitude of the residual echo at a current frame based on a magnitude of a linear echo of a reference signal at the current frame and a magnitude of the linear echo of the reference signal at a past frame, and update weights to apply to the magnitude of the linear echo at the current frame and the magnitude of the linear echo at the past frame.

According to an example embodiment, a non-transitory computer-readable medium stores a program code executable by a processor. In some example embodiments, the program code is executable by the processor to, estimate a magnitude of a residual echo of a microphone signal at a current frame based on a magnitude of a linear echo of a reference signal at the current frame and a magnitude of the linear echo of the reference signal at a past frame, update weights to apply to the magnitude of the linear echo at the current frame and the magnitude of the linear echo at the past frame, and calculate a suppression gain based on the magnitude of the residual echo and a magnitude of an output signal obtained by canceling the linear echo from a microphone signal, the output signal being multiplied by the suppression gain to generate a final output signal.

According to an example embodiment, an application processor includes an audio processor; and a non-transitory computer-readable medium configured to store a program code executable by the audio processor to, generate an output signal by canceling a linear echo of a reference signal from a microphone signal input to a microphone as the reference signal is output from a speaker, the linear echo being determined based on a transfer path between the speaker and the microphone, and estimate a magnitude of a residual echo at a current frame based on one or more of a magnitude of the linear echo at the current frame and a magnitude of the linear echo at a past frame.

BRIEF DESCRIPTION OF THE DRAWINGS

The above and other objects and features of the inventive concepts will become apparent by describing in detail example embodiments thereof with reference to the accompanying drawings.

DETAILED DESCRIPTION

Figure 1:
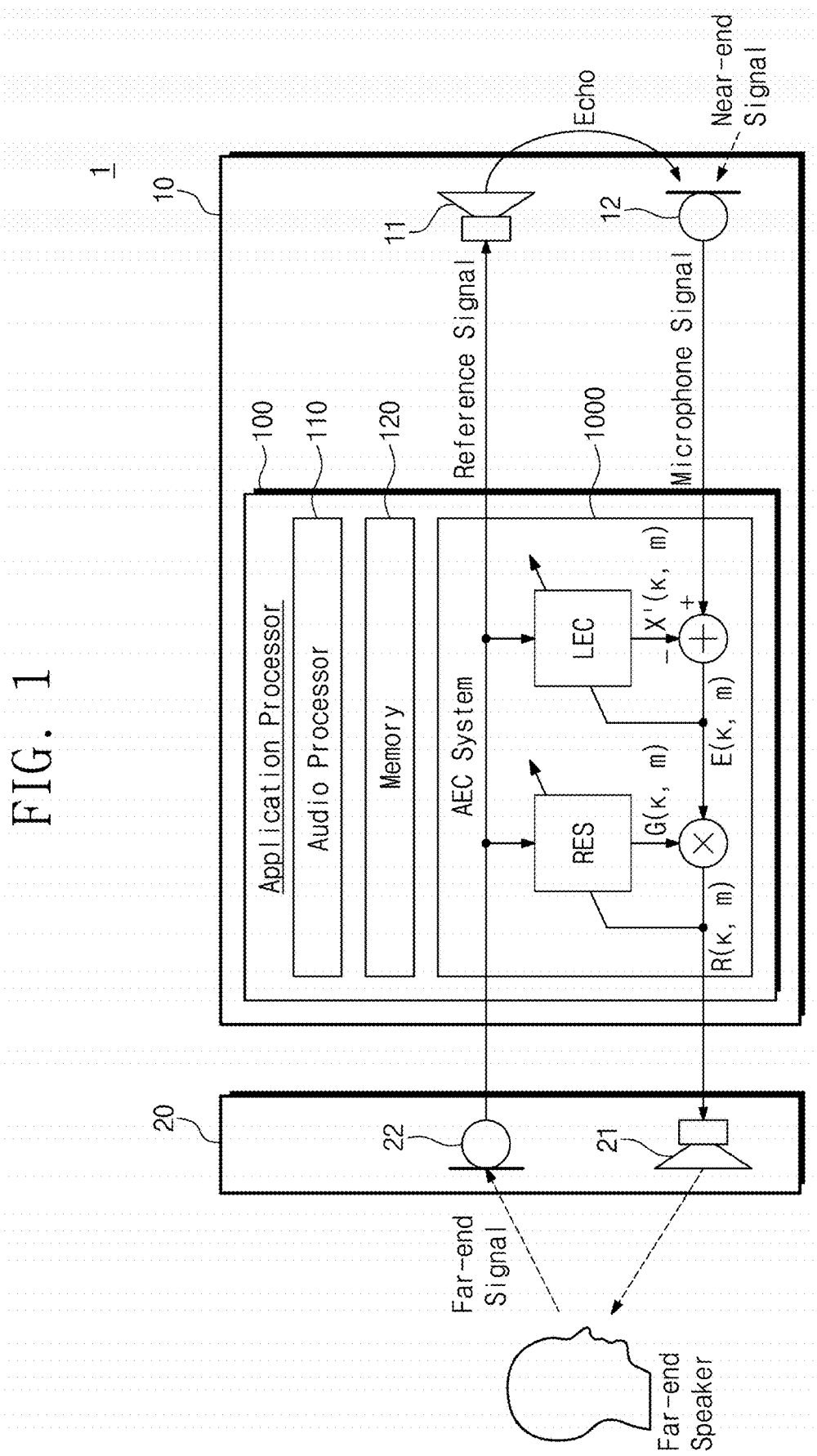
FIG. 1 illustrates a communication system according to an example embodiment of the inventive concepts.

FIG. 1 illustrates a communication system according to an example embodiment of the inventive concepts.

Referring to FIG. 1, a communication system 1 may include an electronic device 10 that is associated with or adjacent to a near-end speaker and an electronic device 20 that is associated with or adjacent to a far-end speaker. A far-end signal (hereinafter referred to as a "reference signal") corresponding to a voice of the far-end speaker may be input to the electronic device 20 through a microphone 22.

The electronic device 20 may transmit the reference signal to the electronic device 10 based on a wired/wireless communication protocol.

The electronic device 10 according to an example embodiment of the inventive concepts may receive the reference signal from the electronic device 20 and may output the reference signal through a speaker 11. The electronic device 10 may receive ambient sound (e.g., a voice of a near-end speaker or a noise) of the electronic device 10 through a microphone 12. However, as the reference signal is output through the speaker 11, an echo (or an echo signal) with respect to the reference signal may be input to the microphone 12 of the electronic device 10. Accordingly, the electronic device 10 may cancel or suppress an echo included in a microphone signal for inhibiting (or, alternatively, preventing) a voice of the far-end speaker from being again played to the far-end speaker through a speaker 21 of the electronic device 20.

The electronic device 10 may include an application processor 100. The application processor 100 may include an audio processor 110 and a memory 120.

The electronic device 10 may include an acoustic echo cancellation (AEC) system 1000 implemented using processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

For example, the application processor 100 may include an acoustic echo cancellation (AEC) system 1000 implemented by using a hardware component(s), circuit(s), or module(s) for canceling the echo associated with the reference signal. For another example, the application processor 100 may execute or implement the AEC system 1000 that is executable by using a software component(s), a functional block(s), or a module(s).

In the case where all or a part of the AEC system 1000 is implemented by software, the audio processor 110 may execute a program code stored in the memory 120 to execute or implement the AEC system 1000. The audio processor 110 may include at least one core (processing unit) that may read and execute a command(s), an algorithm(s), or a function(s) included in the program code from the memory 120 for executing the AEC system 1000.

The memory 120 may be a non-transitory computer-readable medium that stores the program code for executing the AEC system 1000. The memory 120 may be a random access memory (RAM), a flash memory, a read only memory (ROM), an electrically programmable ROM (EPROM), an electrically erasable programmable ROM (EEPROM), a register, a hard disk drive, a removable disk, a CD-ROM, or any type of storage medium. As illustrated in FIG. 1, the memory 120 may be implemented within the application processor 100; alternatively, unlike illustration of FIG. 1, the memory 120 may be a storage medium that is implemented independently of the application processor 100 within the electronic device 10 or is positioned outside the electronic device 10.

The AEC system 1000 may include a linear echo canceler LEC and a residual echo suppressor RES. The linear echo canceler LEC may receive the reference signal. The linear echo canceler LEC may estimate (calculate) a linear echo X'($\kappa$, m) of the reference signal linearly based on a transfer path between the speaker 11 and the microphone 12. "$\kappa$ (kappa)" is a frame index associated with a time, and "m" is a frequency band. For example, the linear echo canceler LEC may execute a convolution operation for the reference signal and a transfer function that is in advance modeled to indicate the transfer path. The linear echo canceler LEC may include an adaptive filter. The linear echo canceler LEC may cancel the linear echo X'($\kappa$, m) from a microphone signal by using the adaptive filter and may generate an output signal E($\kappa$, m) as a result of the cancellation. A coefficient of the adaptive filter may be continually updated so that the linear echo X'($\kappa$, m) is matched with an actual echo of the microphone signal.

Since the linear echo canceler LEC estimates the linear echo X'($\kappa$, m) of the reference signal linearly, a residual echo may exist in the output signal E($\kappa$, m). For example, nonlinear distortion of an echo, that is, causes of harmonic distortion (HD) may include a nonlinear characteristic of the speaker 11 itself, a vibration generated as the speaker 11 and the microphone 12 are adjacent to each other, nonlinear characteristics of components of the electronic device 10, etc.

The residual echo suppressor RES may suppress a residual echo that is not canceled by the linear echo canceler LEC. The residual echo suppressor RES may generate a suppression gain G($\kappa$, m), may multiply the suppression gain G($\kappa$, m) and the output signal E($\kappa$, m) together, and may generate an output signal R($\kappa$, m). The residual echo suppressor RES may adaptively update the suppression gain G($\kappa$, m) so that a residual echo is not included in the output signal R($\kappa$, m) as possible as maximum. The electronic device 10 may provide the echo-canceled microphone signal to the electronic device 20, and the far-end speaker may hear the microphone signal, in which an echo is not included as possible as maximum, through the speaker 21.

Figure 2:
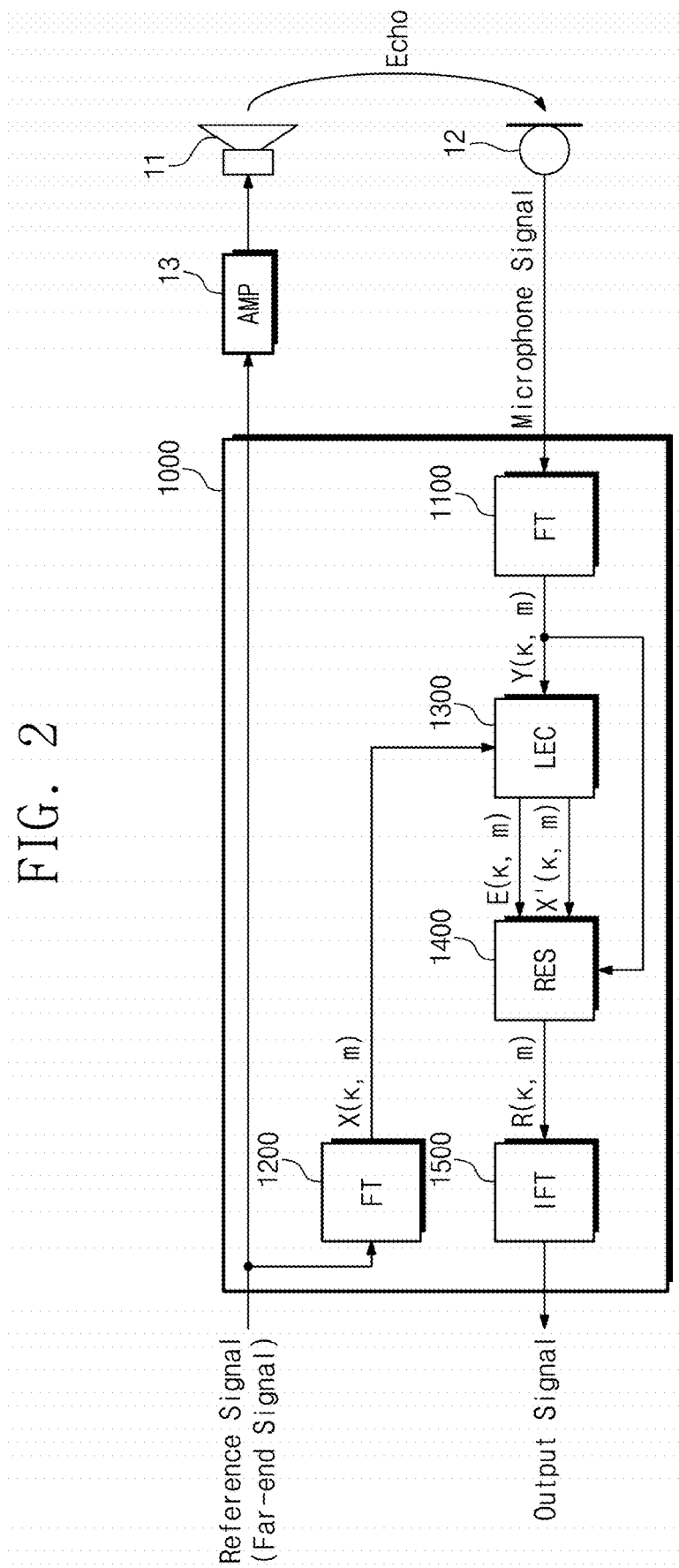
FIG. 2 illustrates an AEC system of FIG. 1 according to an example embodiment of the inventive concepts.

FIG. 2 illustrates an AEC system of FIG. 1 according to an example embodiment of the inventive concepts.

Referring to FIG. 2, the AEC system 1000 of the electronic device 10 is illustrated in detail, and an example embodiment is illustrated in FIG. 2 as a reference signal is output through the speaker 11 after being amplified through an amplifier 13 and as an echo is captured by the microphone 12. For brevity of illustration and for convenience of description, any other components of the electronic device 10 are omitted.

The AEC system 1000 may include first and second Fourier transform (FT) modules 1100 and 1200, a linear echo canceler 1300, a residual echo suppressor 1400, and an inverse Fourier transform (IFT) module 1500. A transform module may also be called a "converter" or a "transformer". As discussed above, the AEC system 1000 may be implemented by execution of a program code to estimate a magnitude of a residual echo, and the executed program code may transform the processor into a special purpose computer to perform the functions of a component(s), a function(s), a block(s), or a module(s) of the AEC system 1000.

The first Fourier transform module 1100 may receive a microphone signal and may transform (convert) the microphone signal from a time domain to a frequency domain. For example, the first Fourier transform module 1100 may perform a transformation operation based on modulated complex lapped transform (MCLT), Fourier transform (FT), short-time Fourier transform (STFT), discrete Fourier transform (DFT), fast Fourier transform (FFT), etc. and may output a microphone signal Y($\kappa$, m). The second Fourier transform module 1200 may receive the reference signal and may transform the reference signal from a time domain to a frequency domain. The second Fourier transform module 1200 may perform a transformation operation in a way similar to the first Fourier transform module 1100 and may output a reference signal X(κ, m).

The linear echo canceler 1300 may execute a convolution operation on a reference signal and a transfer function that is in advance modeled to indicate a path between the speaker 11 and the microphone 12 and may estimate a linear echo X'(κ, m) of the reference signal. The linear echo canceler 1300 may provide the linear echo X'(κ, m) and the output signal E(κ, m), which is obtained by canceling the linear echo X'(κ, m) from the microphone signal Y(κ, m), to the residual echo suppressor 1400.

The residual echo suppressor 1400 may receive the microphone signal Y(κ, m), the linear echo X'(κ, m), an estimated residual echo, and the output signal E(κ, m). The residual echo suppressor 1400 according to an example embodiment of the inventive concepts may calculate the suppression gain G(κ, m) for suppressing a residual echo by using the microphone signal Y(κ, m), the linear echo X'(κ, m), and the estimated residual echo. The residual echo suppressor 1400 may generate the output signal R(κ, m) by multiplying the suppression gain G(κ, m) and the output signal E(κ, m) together.

The inverse Fourier transform module 1500 may receive the output signal R(κ, m) from the residual echo suppressor 1400. The inverse Fourier transform module 1500 may transform the output signal R(κ, m) from a frequency domain to a time domain. For example, the inverse Fourier transform module 1500 may perform a transformation operation based on inverse MCLT, inverse FT, inverse STFT, inverse DFT, inverse FFT, etc.

Figure 3A:
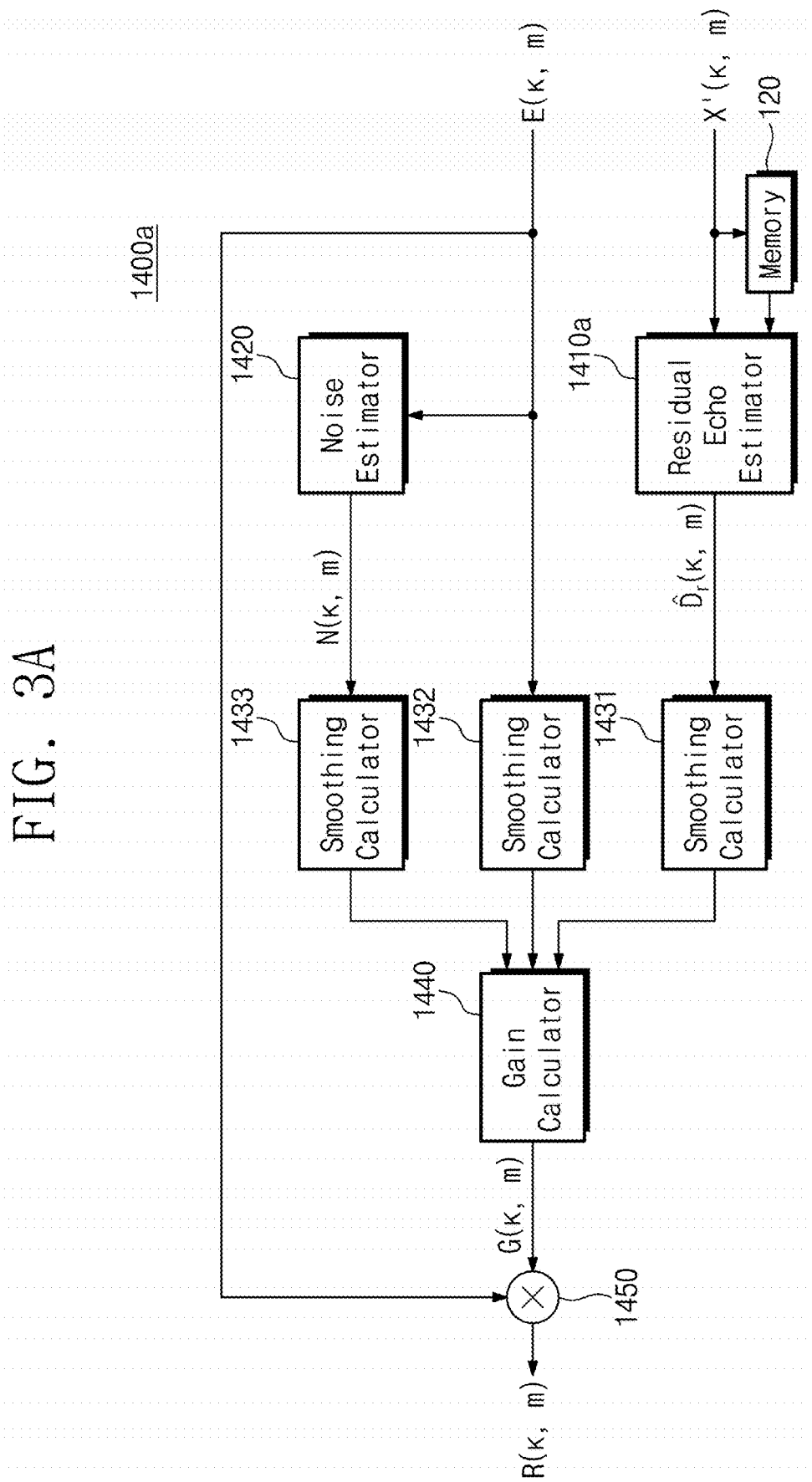
FIG. 3A illustrates a residual echo suppressor of FIG. 2 according to an example embodiment of the inventive concepts.

FIG. 3A illustrates a residual echo suppressor of FIG. 2 according to an example embodiment of the inventive concepts.

Referring to FIG. 3A, a residual echo suppressor 1400a may include a residual echo estimator 1410a, a noise estimator 1420, first to third smoothing calculators 1431 to 1433, a gain calculator 1440, and a multiplier 1450. The residual echo suppressor 1400a may be one example embodiment of the residual echo suppressor 1400 of FIG. 2. However, example embodiments are not limited thereto.

The residual echo estimator 1410a may receive the linear echo X'(κ, m) and linear echoes X'(κ−t, m) at (or, alternatively, in) past frames stored in the memory 120. Unlike the illustration of FIG. 2, the residual echo estimator 1410a may not receive the microphone signal Y(κ, m). The residual echo estimator 1410a may estimate a magnitude (amplitude) of a residual echo Dr (κ, m) at a current frame by using a magnitude of the linear echo X'(κ, m) at the current frame and magnitudes of the linear echoes X'(κ−t, m) at the past frames. For example, the residual echo estimator 1410a may calculate the magnitude of the residual echo $\hat{D}_r(\kappa, m)$ at the current frame using Equation 1.

$$|\hat{D}_r(\kappa, m)| = \sum_{i=1}^{M}\sum_{j=1}^{H}\sum_{k=-K}^{K} \delta(i, j, k, m) W_R(i, j, k)|X'(\kappa, i)| + \sum_{t=1}^{T} W_{T1}(t, m)|X'(\kappa-t,m)|$$ [Equation 1]

-continued
$$\text{where, } \delta(i, j, k, m) = \begin{cases} 1, & \text{if } i \times j + k = m \\ 0, & \text{otherwise} \end{cases}$$

In Equation 1, "i" is fundamental frequency band, "M" is the number of sub-bands, "j" is a harmonic, "H" is the number of harmonics to be considered, "2K+1" that is a k (alphabet) index is a length of a harmonic search window, "m" is a frequency bin index, "$W_R(i, j, k)$" are weights that are applied to a magnitude of the linear echo X'(κ, m) at a current frame, "T" is the number of past frames for performing estimation by using "t" as an index, and "$W_{T1}(t, m)$" are weights that are applied to magnitudes of the linear echoes X'(κ−t, m) at past frames. The weights $W_R(i, j, k)$ and $W_{T1}(t, m)$ may be adaptively updated by the residual echo estimator 1410a.

According to an example embodiment of the inventive concepts, the residual echo estimator 1410a may estimate the magnitude of the residual echo $\hat{D}_r(\kappa, m)$ at a current frame by using magnitudes of the linear echoes X'(κ−t, m) at past frames as well as a magnitude of the linear echo X'(κ, m) at the current frame. A time correlation of the linear echo X'(κ, m) may be used to calculate the magnitude of the residual echo $\hat{D}_r(\kappa, m)$. Accordingly, echo return loss enhancement (ERLE) of the AEC system 1000 may be improved.

The magnitudes of the linear echoes X'(κ−t, m) at the past frames may be stored in the memory 120. As described above, the memory 120 may be any type of storage medium. The memory 120 may be registers in the application processor 100, a tightly coupled memory (TCM), or a static random access memory (SRAM). The memory 120 may be a dynamic random access memory (DRAM) outside the application processor 100. The magnitude of the linear echo X'(κ, m) at the current frame may be stored in the memory 120. Both the magnitudes of the linear echoes X'(κ−t, m) at the past frames and the magnitude of the linear echo X'(κ, m) at the current frame may be used to estimate the magnitude of the residual echo $\hat{D}_r(\kappa+1, m)$.

The noise estimator 1420 may estimate a magnitude of a noise N(κ, m) by using a magnitude of the output signal E(κ, m) of the linear echo canceler 1300. For example, the noise estimator 1420 may calculate the noise N(κ, m) depending on minimum statics.

The first to third smoothing calculators 1431 to 1433 may respectively execute smoothing operations on the magnitude of the residual echo $\hat{D}_r(\kappa, m)$, the magnitude of the output signal E(κ, m) of the linear echo canceler 1300, and the magnitude of the noise N(κ, m). The first to third smoothing calculators 1431 to 1433 may apply a recursive average to the magnitude of the residual echo $\hat{D}_r(\kappa, m)$, the magnitude of the output signal E(κ, m) of the linear echo canceler 1300, and the magnitude of the noise N(κ, m). For example, the smoothing calculators 1431 to 1433 may calculate smoothed magnitudes of a residual echo, an output signal of the linear echo canceler 1300, and a noise using Equation 2 to Equation 4, respectively.

$$\overline{D}_r(\kappa,m)=(1-\alpha_1)\overline{D}_r(\kappa-1,m)+\alpha_1|\hat{D}_r(\kappa,m)|$$ [Equation 2]

$$\overline{D}_r(\kappa,m)=(1-\alpha_1)\overline{D}_r(\kappa-1,m)+\alpha_1|\hat{D}_r(\kappa,m)|$$ [Equation 3]

$$\overline{D}_r(\kappa,m)=(1-\alpha_1)\overline{D}_r(\kappa-1,m)+\alpha_1|\hat{D}_r(\kappa,m)|$$ [Equation 4]

In Equation 2 to Equation 4, "$\alpha_1$", "$\alpha_2$", and "$\alpha_3$" may be variables between 0 and 1, and may be the same as or different from each other.

The gain calculator 1440 may calculate the suppression gain G(κ, m), which is to be multiplied with the output signal E(κ, m) of the linear echo canceler 1300, by using the smoothed magnitudes of the residual echo, the output signal of the linear echo canceler 1300, and the noise. The gain calculator 1440 may calculate the suppression gain G(κ, m) by using various operation techniques. For example, the gain calculator 1440 may calculate the suppression gain G(κ, m) using Equation 5 based on Spectral subtraction.

$$G(\kappa, m) = \frac{\max(\overline{E}(\kappa, m) - \beta \cdot \overline{D}_r(\kappa, m), \overline{N}(\kappa, m))}{\overline{E}(\kappa, m)} \qquad \text{[Equation 5]}$$

In Equation 5, "β" is a variable between 0 and 1.

For another example, the suppression gain G(κ, m) may be calculated by Equation 6 based on wiener filter.

$$G(\kappa, m) = \max\left(\frac{\varsigma(\kappa, m)}{1 + \varsigma(\kappa, m)}, \frac{\overline{N}(\kappa, m)}{\overline{E}(\kappa, m)}\right) \qquad \text{[Equation 6]}$$

In Equation 6, ζ(κ, m) may be calculated by Equation 7.

$$\varsigma(\kappa, m) = \\ \alpha_4 \cdot u(\gamma(\kappa, m) - 1) + (1 - \alpha_4) \cdot \frac{(G(\kappa - 1, m)E(\kappa - 1, m))^2}{(\overline{D}_r(\kappa - 1, m))^2} \qquad \text{[Equation 7]}$$

In Equation 7, "α$_4$" is a variable between 0 and 1, and u(•) is a unit step function, and γ(κ, m) may be calculated by Equation 8.

$$\gamma(\kappa, m) = \alpha_5 \cdot \gamma(\kappa - 1, m) + (1 - \alpha_5) \cdot \frac{(\overline{E}(\kappa, m))^2}{(\overline{D}_r(\kappa, m))^2} \qquad \text{[Equation 8]}$$

In Equation 8, "α$_5$" is a variable between 0 and 1.

For another example, the gain calculator 1440 may calculate the suppression gain G(κ, m) using Equation 9 based on minimum mean square error—short time spectral amplitude estimator (MMSE-STSA).

$$G(\kappa, m) = \\ \max\left(\Gamma(1.5)\frac{\sqrt{v(\kappa, m)}}{\gamma(\kappa, m)}M(-0.5; 1; -v(\kappa, m)), \frac{\overline{N}(\kappa, m)}{\overline{E}(\kappa, m)}\right) \qquad \text{[Equation 9]}$$

In Equation 9, Γ(•) is a gamma function, v(κ, m) may be calculated by Equation 10, and M(•;•;•) may be a Confluent hypergeometric function.

$$v(\kappa, m) = \frac{\varsigma(\kappa, m)}{1 + \varsigma(\kappa, m)}\gamma(k, m) \qquad \text{[Equation 10]}$$

The multiplier 1450 may generate the output signal R(κ, m) by multiplying the suppression gain G(κ, m) and the output signal E(κ, m) of the linear echo canceler 1300 together.

Figure 3B:
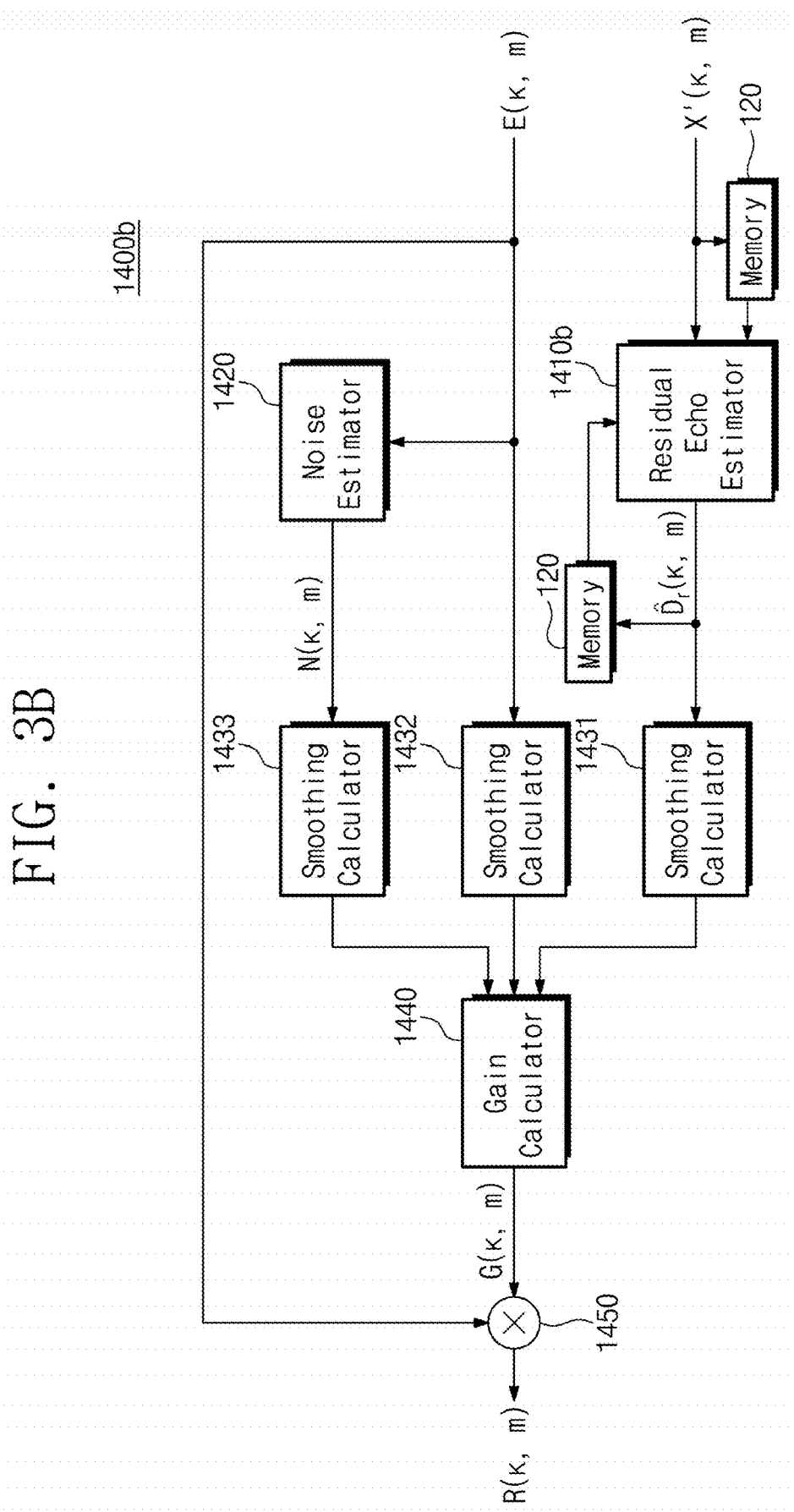
FIG. 3B illustrates a residual echo suppressor of FIG. 2 according to another example embodiment of the inventive concepts.

FIG. 3B illustrates a residual echo suppressor of FIG. 2 according to another example embodiment of the inventive concepts.

Referring to FIG. 3B, a residual echo suppressor 1400b may include a residual echo estimator 1410b, the noise estimator 1420, the first to third smoothing calculators 1431 to 1433, the gain calculator 1440, and the multiplier 1450. The residual echo suppressor 1400b may be one example embodiment of the residual echo suppressor 1400 of FIG. 2. However, example embodiments are not limited thereto. A description will be focused on a difference between the residual echo estimator 1410a and the residual echo estimator 1410b, and the remaining components 1420 to 1450 are described with reference to FIG. 3A.

The residual echo estimator 1410b may receive the linear echo X'(κ, m) and the linear echoes X'(κ−t, m) at past frames stored in the memory 120. Unlike illustration of FIG. 2, the residual echo estimator 1410b may not receive the microphone signal Y(κ, m). The residual echo estimator 1410b may further receive residual echoes $\hat{D}_r$(κ−t, m) at past frames stored in the memory 120. The residual echo estimator 1410b may estimate a magnitude of a residual echo $\hat{D}_r$(κ, m)) at a current frame by using a magnitude of the linear echo X'(κ, m) at the current frame, magnitudes of the linear echoes X'(κ−t, m) at past frames, and magnitudes of residual echoes $\hat{D}_r$(κ−t, m) at the past frames. For example, the residual echo $\hat{D}_r$(κ, m)) at the current frame may be calculated by Equation 11.

$$\left|\hat{D}_r(\kappa, m)\right| = \sum_{i=1}^{M}\sum_{j=1}^{H}\sum_{k=-K}^{K}\delta(i, j, k, m)W_R(i, j, k)|X'(\kappa, i)| + \\ \sum_{t=1}^{T}W_{T1}(t, m)|X'^{(\kappa-t, m)}| + \sum_{t=1}^{T}W_{T2}(t, m)|\hat{D}_r(\kappa - t, m)| \qquad \text{[Equation 11]}$$

$W_{T2}$(t, m) are weights that are applied to the magnitudes of the residual echoes $\hat{D}_r$ (κ−t, m) at the past frames. The weights $W_{T2}$(t, m) may be adaptively updated by the residual echo estimator 1410b. According to another embodiment of the inventive concept, the residual echo estimator 1410b may estimate a magnitude of the residual echo at the current frame $\hat{D}_r$ (κ, m) by using magnitudes of the linear echoes X'(κ−t, m) at the past frames, magnitudes of the residual echoes $\hat{D}_r$ (κ−t, m) at the past frames, as well as a magnitude of the linear echo X'(κ, m) at the current frame. A time correlation of the linear echo X'(κ, m) and a time correlation of the residual echo $\hat{D}_r$(κ, m) may be used to calculate the magnitude of the residual echo $\hat{D}_r$(κ, m). Accordingly, the degree to which the ERLE is improved by the residual echo estimator 1410b may be greater than the degree to which the ERLE is improved by the residual echo estimator 1410a of FIG. 3A.

The magnitudes of the residual echoes $\hat{D}_r$(κ−t, m) at the past frames may be stored in the memory 120. The magnitude of the residual echo $\hat{D}_r$ (κ, m) at the current frame may also be stored in the memory 120. The magnitudes of the residual echoes $\hat{D}_r$(κ−t, m) at the past frames, the magnitude of the residual echo $\hat{D}_r$(κ, m) at the current frame, the magnitudes of the linear echoes X'(κ−t, m) at the past frames, and the magnitude of the linear echo X'(κ, m) at the current frame may be used to estimate a magnitude of the residual echo $\hat{D}_r$ (κ−t, m) at a next frame.

Figure 3C:
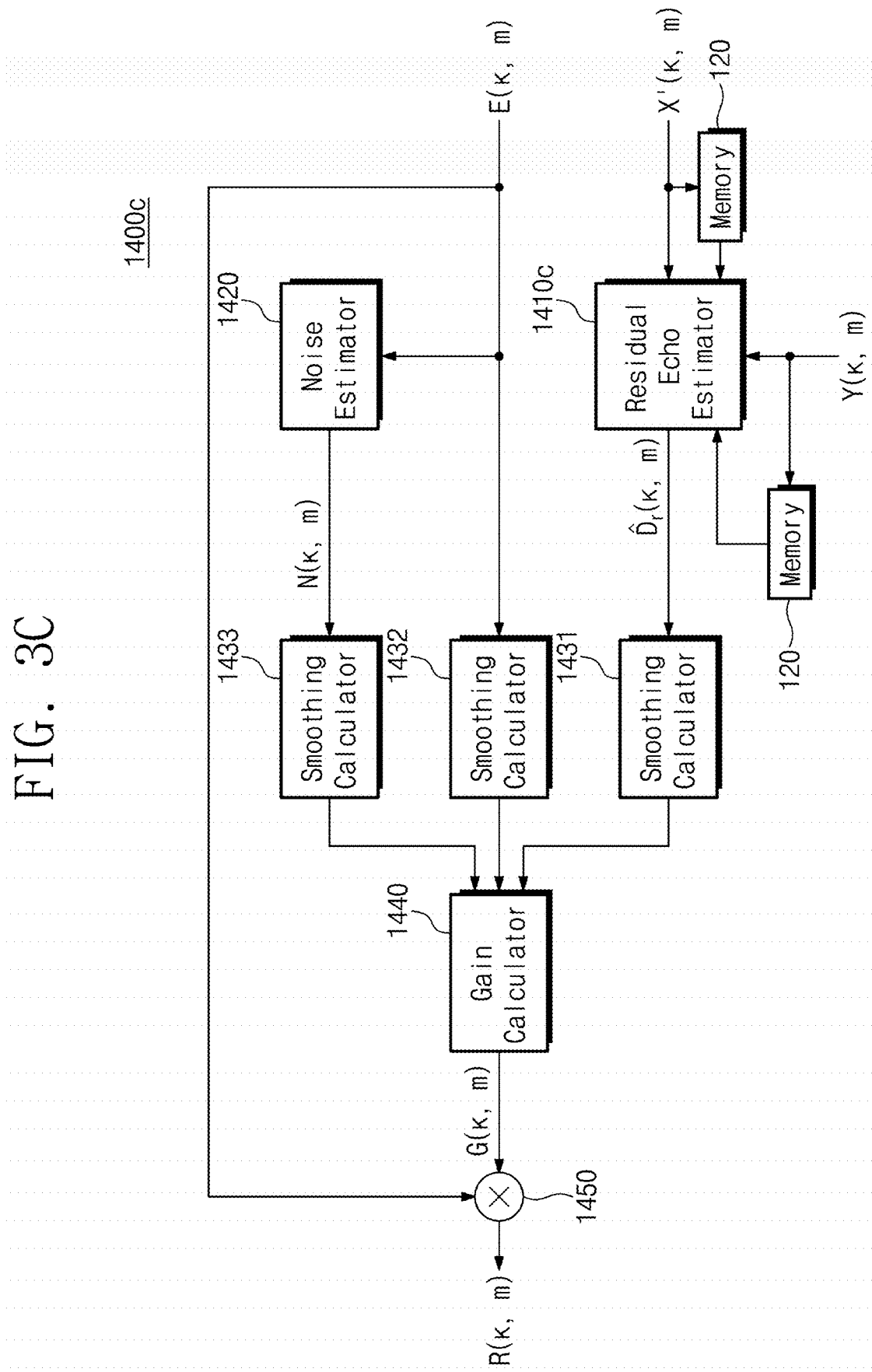
FIG. 3C illustrates a residual echo suppressor of FIG. 2 according to another example embodiment of the inventive concepts.

FIG. 3C illustrates a residual echo suppressor of FIG. 2 according to another example embodiment of the inventive concepts.

Referring to FIG. 3C, a residual echo suppressor 1400c may include a residual echo estimator 1410c, the noise estimator 1420, the first to third smoothing calculators 1431 to 1433, the gain calculator 1440, and the multiplier 1450. The residual echo suppressor 1400c may be one example embodiment of the residual echo suppressor 1400 of FIG. 2. However, example embodiments are not limited thereto. A description will be focused on a difference between the residual echo estimator 1410a and the residual echo estimator 1410c, and the remaining components 1420 to 1450 are described with reference to FIG. 3A.

The residual echo estimator 1410c may receive the linear echo X'(κ, m) and the linear echoes X'(κ−t, m) at past frames stored in the memory 120. The residual echo estimator 1410c may further receive the microphone signal Y(κ, m) and microphone signals Y(κ−t, m) at past frames stored in the memory 120. The residual echo estimator 1410c may estimate a magnitude of the residual echo $\hat{D}_r(\kappa, m)$ at a current frame by using a magnitude of the linear echo X'(κ, m) at the current frame, magnitudes of the linear echoes X'(κ−t, m) at the past frames, a magnitude of the microphone signal Y(κ, m) at the current frame, and magnitudes of the microphone signals Y(κ−t, m) at the past frames. For example, the magnitude of the residual echo $\hat{D}_r(\kappa, m)$ at the current frame may be calculated by Equation 12.

$$|\hat{D}_r(\kappa, m)| = \sum_{i=1}^{M}\sum_{j=1}^{H}\sum_{k=-K}^{K} \delta(i,j,k,m)W_R(i,j,k)|X'(\kappa, i)| + \sum_{t=1}^{T} W_{T1}(t,m)|X'^{(\kappa-t,m)}| + \sum_{t=0}^{T} W_{T3}(t,m)|Y(\kappa-t,m)|$$

[Equation 12]

$W_{T3}(t, m)$ are weights that are applied the magnitude of the microphone signal Y(κ, m) at the current frame and the magnitudes of the microphone signals Y(κ−t, m) at the past frames. The weights $W_{T3}(t, m)$ may be adaptively updated by the residual echo estimator 1410c. According to another embodiment of the inventive concept, the residual echo estimator 1410c may estimate the magnitude of the residual echo $\hat{D}_r(\kappa, m)$ at the current frame by using the magnitudes of the linear echoes X'(κ−t, m) at the past frames, the magnitude of the microphone signal Y(κ, m) at the current frame, and the magnitudes of the microphone signals Y(κ−t, m) at the past frames, as well as the magnitude of the linear echo X'(κ, m) at the current frame. A time correlation of the linear echo X'(κ, m) and a time correlation of the microphone signal Y(κ, m) may be used to calculate the magnitude of the residual echo $\hat{D}_r(\kappa, m)$. Accordingly, the degree to which the ERLE is improved by the residual echo estimator 1410c may be greater than the degree to which the ERLE is improved by the residual echo estimator 1410a of FIG. 3A.

The magnitudes of the microphone signals Y(κ−t, m) at the past frames may be stored in the memory 120. The magnitude of the microphone signal Y(κ, m) at the current frame may be stored in the memory 120. The magnitudes of the microphone signals Y(κ−t, m) at the past frames, the magnitude of the microphone signal Y(κ, m) at the current frame, the magnitudes of the linear echoes X'(κ−t, m) at the past frames, and the magnitude of the linear echo X'(κ, m) at the current frame may be used to estimate a magnitude of the residual echo $\hat{D}_r(+1, m))$ at a next frame.

Figure 3D:
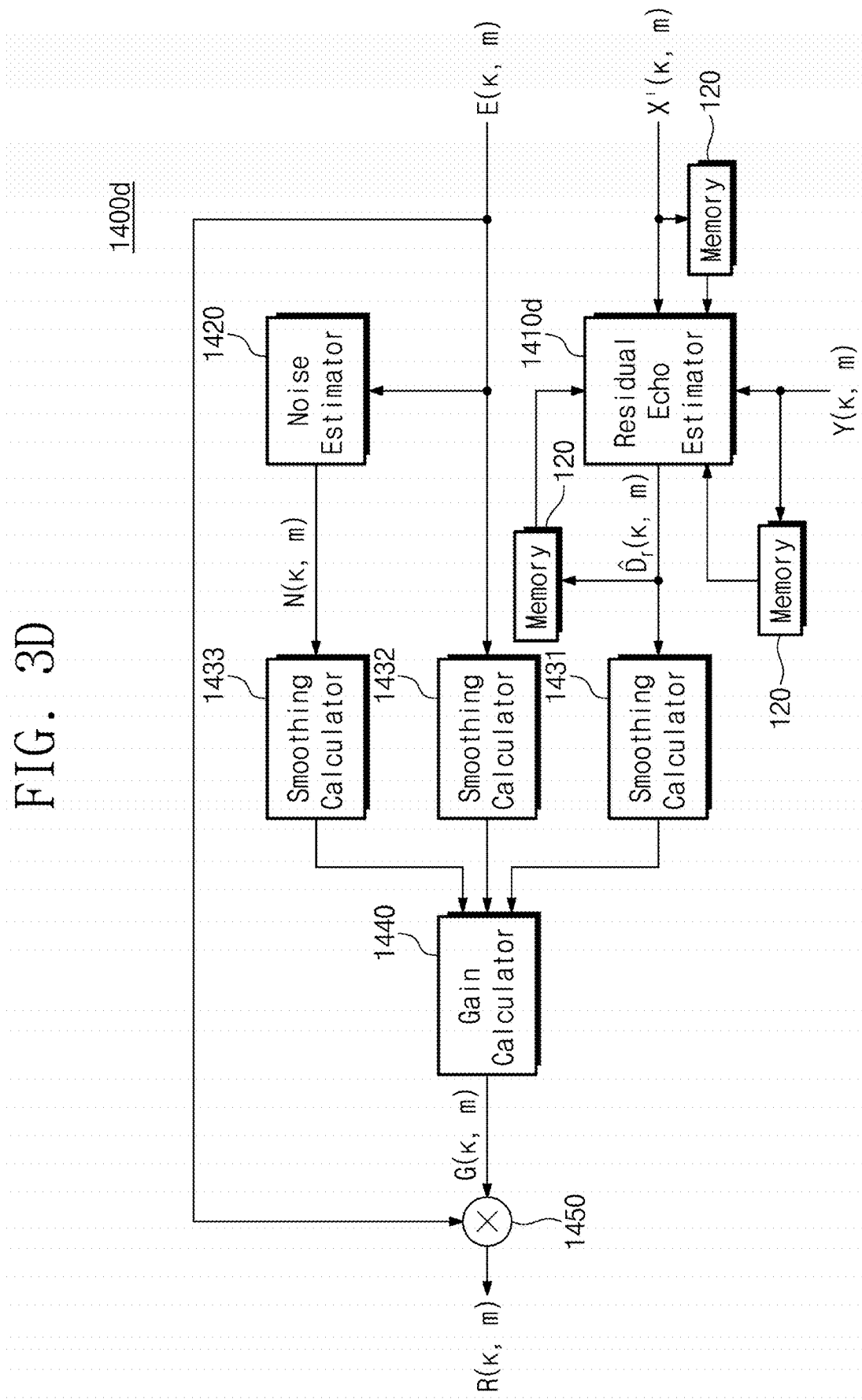
FIG. 3D illustrates a residual echo suppressor of FIG. 2 according to another example embodiment of the inventive concepts.

FIG. 3D illustrates a residual echo suppressor of FIG. 2 according to another example embodiment of the inventive concepts.

Referring to FIG. 3D, a residual echo suppressor 1400d may include a residual echo estimator 1410d, the noise estimator 1420, the first to third smoothing calculators 1431 to 1433, the gain calculator 1440, and the multiplier 1450. The residual echo suppressor 1400d may be one embodiment of the residual echo suppressor 1400 of FIG. 2. A description will be focused on a difference between the residual echo estimator 1410a and the residual echo estimator 1410d, and the remaining components 1420 to 1450 are described with reference to FIG. 3A.

The residual echo estimator 1410d may receive the linear echo X'(κ, m) and the linear echoes X'(κ−t, m) at past frames stored in the memory 120. The residual echo estimator 1410d may further receive the residual echoes $\hat{D}_r(\kappa-t, m)$ at the past frames stored in the memory 120, the microphone signal Y(κ, m) at the current frame, and the microphone signals Y(κ−t, m) at the past frames stored in the memory 120. The residual echo estimator 1410d may estimate a magnitude of the residual echo $\hat{D}_r(\kappa, m)$ at the current frame by using a magnitude of the linear echo X'(κ, m) at the current frame, magnitudes of the linear echoes X'(κ−t, m) at the past frames, magnitudes of the residual echoes $\hat{D}_r(\kappa-t, m)$ at the past frames, a magnitude of the microphone signal Y(κ, m) at the current frame, and magnitudes of the microphone signals Y(κ−t, m) at the past frames. For example, the magnitude of the residual echo $\hat{D}_r(\kappa, m)$ at the current frame may be calculated by Equation 13.

$$|\hat{D}_r(\kappa, m)| = \sum_{i=1}^{M}\sum_{j=1}^{H}\sum_{k=-K}^{K} \delta(i,j,k,m)W_R(i,j,k)|X'(\kappa, i)| + \sum_{t=1}^{T} W_{T1}(t,m)|X'^{(\kappa-t,m)}| + \sum_{t=1}^{T} W_{T2}(t,m)|\hat{D}_r(\kappa-t,m)| + \sum_{t=0}^{T} W_{T3}(t,m)|Y(\kappa-t,m)|$$

[Equation 13]

Weights WR(i, j, k), WT1(t, m), WT2(t, m), and WT3(t, m) may be adaptively updated by the residual echo estimator 1410d. According to another embodiment of the inventive concept, the residual echo estimator 1410d may estimate the magnitude of the residual echo $\hat{D}_r(\kappa, m)$ at the current frame by using the magnitudes of the linear echoes X'(κ−t, m) at the past frames, the magnitudes of the residual echoes $\hat{D}_r(\kappa-t, m)$ at the past frames, the magnitude of the microphone signal Y(κ, m) at the current frame, and the magnitudes of the microphone signals Y(κ−t, m) at the past frames, as well as the magnitude of the linear echo X'(κ, m) at the current frame. A time correlation of the linear echo X'(κ, m), a time correlation of the residual echo $\hat{D}_r(\kappa, m)$, and a time correlation of the microphone signal Y(κ, m) may be used to calculate a magnitude of the residual echo $\hat{D}_r(\kappa, m)$. Accordingly, the degree to which the ERLE is improved by the residual echo estimator 1410d may be greater than the degree to which the ERLE is improved by the residual echo estimators 1410a to 1410c of FIGS. 3A to 3C.

The magnitudes of the linear echoes X'(κ−t, m) at the past frames may be stored in the memory 120. The magnitude of the linear echo X'(κ, m) at the current frame may be stored in the memory 120. The magnitudes of the residual echoes $\hat{D}_r(\kappa-t, m)$ at the past frames may be stored in the memory 120. The magnitude of the residual echo $\hat{D}_r(\kappa, m)$ at the current frame may be stored in the memory 120. The magnitudes of the microphone signals Y(κ−t, m) at the past frames, the magnitude of the microphone signal Y(κ, m) at the current frame, the magnitudes of the linear echoes X'(κ−t, m) at the past frames, the magnitude of the linear echo X'(κ, m) at the current frame, the magnitudes of the residual echoes ($\hat{D}_r$(κ−t, m) at the past frames, and the magnitude of the residual echo $\hat{D}_r$(κ, m) at the current frame may be used to estimate a magnitude of the residual echo $\hat{D}_r$(κ+1, m) at a next frame.

In an example embodiment, each of the residual echo estimators 1410a to 1410d may be a hardware accelerator (i.e., a processor) implemented by using a hardware component(s), a circuit(s), or a module(s). The hardware accelerator may execute the AEC system 1000 together with the audio processor 110 described with reference to FIG. 1. The hardware accelerator may execute operations of the residual echo estimators 1410a to 1410d described with reference to FIGS. 3A to 3D, and the audio processor 110 may execute the remaining operations of the AEC system 1000. In another example embodiment, each of the residual echo estimators 1410a to 1410d may be implemented by the audio processor 110 by execution of software components.

Figure 4:
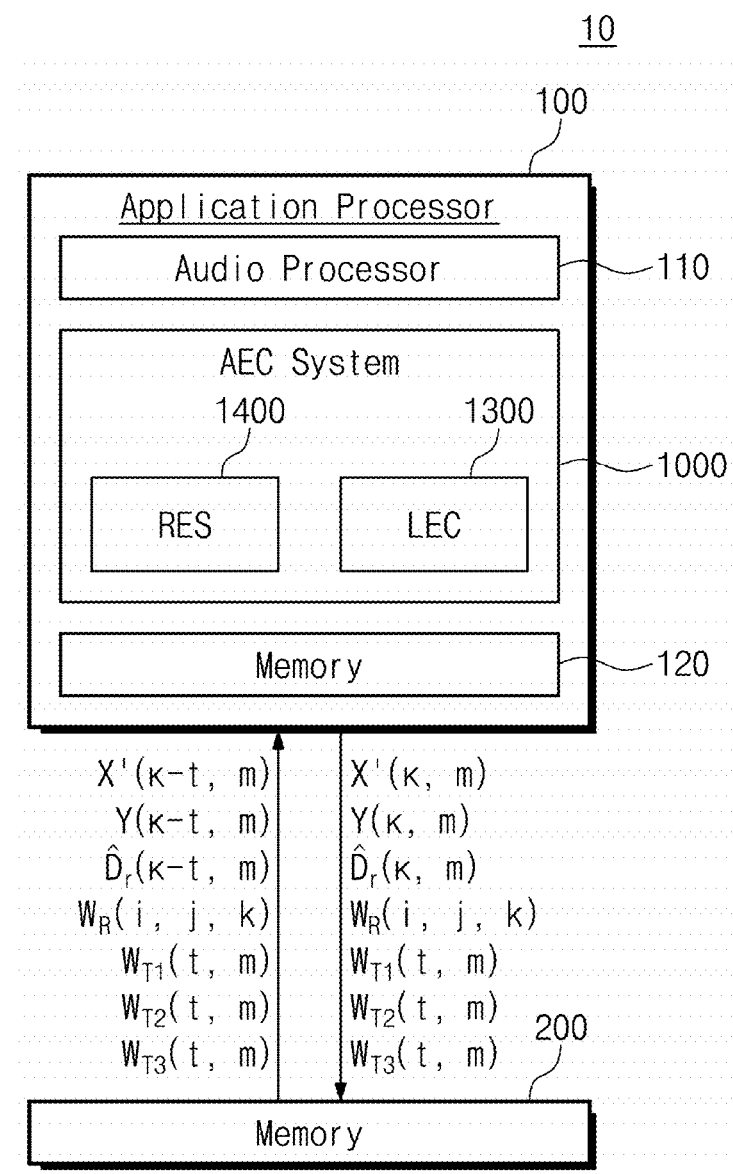
FIG. 4 illustrates an electronic device of FIG. 1 according to an example embodiment of the inventive concepts.

FIG. 4 illustrates an electronic device of FIG. 1 according to an example embodiment of the inventive concepts. FIG. 4 will be described with reference to FIGS. 2 and 3A to 3D.

Referring to FIGS. 2, 3A to 3D and 4, the electronic device 10 may include the application processor 100 and a memory 200. The application processor 100 may include the audio processor 110 and the memory 120. The AEC system 1000 including the linear echo canceler 1300 and the residual echo suppressor 1400 may be executed in the application processor 100.

The memory 120 may be registers, a TCM, or an SRAM positioned inside the application processor 100. The memory 200 may be a DRAM positioned outside the application processor 100. The magnitude of the linear echo X'(κ, m) at the current frame, the magnitude of the microphone signal Y(κ, m), and the magnitude of the residual echo $\hat{D}_r$(κ, m), which are described with reference to FIGS. 2 and 3A to 3D, may be further stored in the memory 200 as well as the memory 120. For example, the memory 120 may operate as a cache memory that stores at least a part or all of the above magnitudes. For another example, the above magnitudes may be stored in the memory 200. The above magnitudes may be transmitted from the application processor 100 to the memory 200 in the unit of a frame, based on a protocol (e.g., a double data rate (DDR) interface) that the memory 200 supports.

The magnitude of the linear echo X'(κ, m) stored in the memory 200, the magnitude of the microphone signal Y(κ, m), and the magnitude of the residual echo $\hat{D}_r$(κ, m) at the current frame may be used to estimate the magnitude of the residual echo $\hat{D}_r$ (κ+1, m) at a next frame and may correspond to magnitudes at a past frame. The memory 200 may transmit the stored magnitudes to the application processor 100 as the magnitudes of the linear echoes X'(κ−t, m), the magnitudes of the microphone signals Y(κ−t, m), and the magnitudes of the residual echoes $\hat{D}_r$ (κ−t, m) at past frames.

Also, the weights $W_R$(i, j, k), $W_{T1}$(t, m), $W_{T2}$(t, m), and $W_{T3}$(t, m) that are applied to the linear echoes X'(κ, m) and X'(κ−t, m) at the current and past frames, the magnitudes of the microphone signals Y(κ, m), and the magnitudes of the residual echoes $\hat{D}_r$(κ−t, m) may be further stored in the memory 200 as well as the memory 120. The memory 200 may transmit the stored weights to the application processor 100. The weights $W_R$(i, j, k), $W_{T1}$(t, m), $W_{T2}$(t, m), and $W_{T3}$(t, m) may be adaptively updated.

Figure 5:
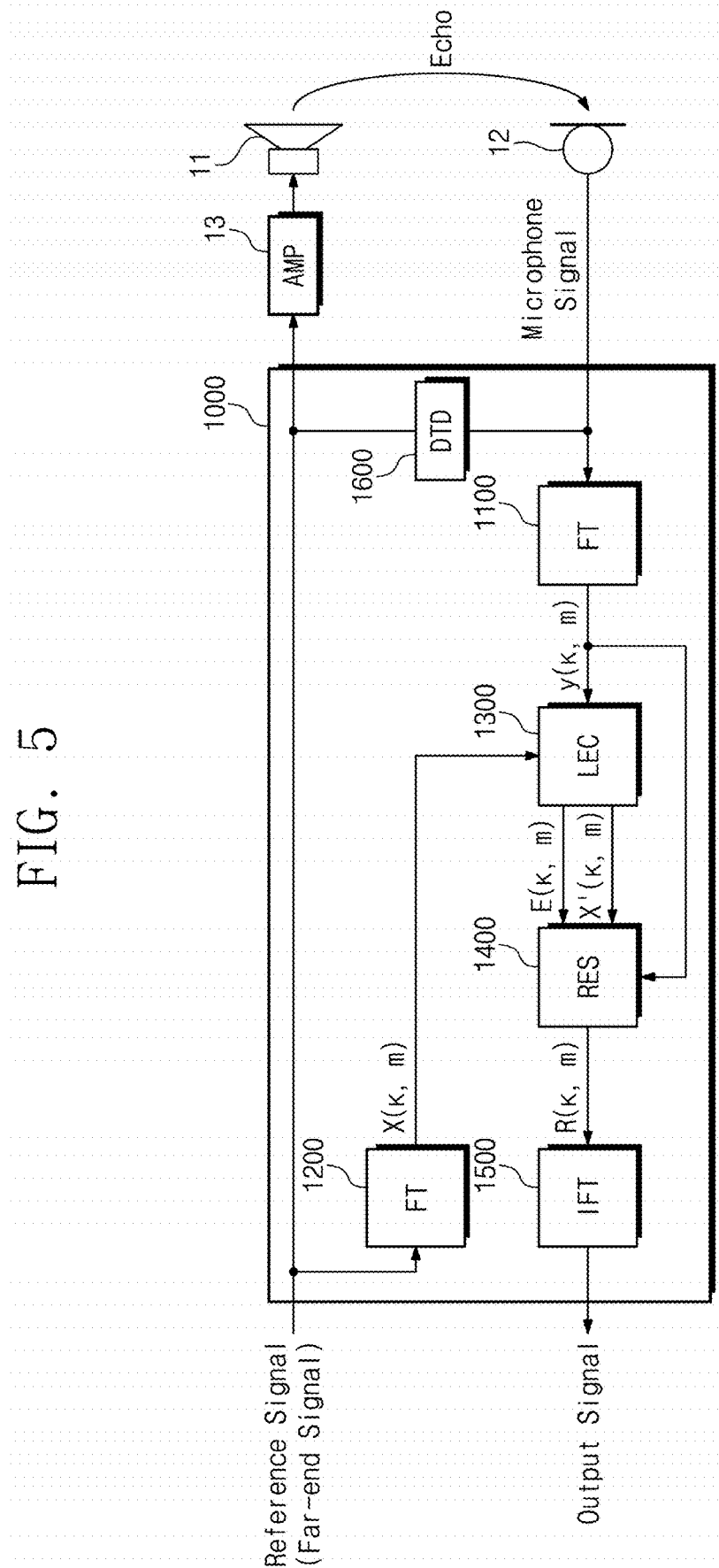
FIG. 5 illustrates an AEC system of FIG. 1 according to another example embodiment of the inventive concepts.

FIG. 5 illustrates an AEC system of FIG. 1 according to another example embodiment of the inventive concepts. FIG. 5 will be described with reference to FIGS. 2 and 3A to 3D.

Referring to FIGS. 2, 3A to 3D and 5, the AEC system 1000 may include the first and second Fourier transform modules 1100 and 1200, the linear echo canceler 1300, the residual echo suppressor 1400, and the inverse Fourier transform module 1500. The AEC system 1000 of FIG. 5 may be implemented or executed to be similar to the AEC system 1000 of FIG. 2. The AEC system 1000 may further include a double talk detector 1600.

The double talk detector 1600 may detect whether a double talk occurs, by using a reference signal and a microphone signal. The double talk may indicate a situation where a voice of the far-end speaker and a voice of the near-end speaker are together input to the electronic device 10. For example, the double talk detector 1600 may detect a double talk by comparing a magnitude of the reference signal with a magnitude of the microphone signal or based on a correlation between the reference signal and the microphone signal.

In an example embodiment, when the double talk is detected by the double talk detector 1600, an estimation way of the residual echo estimators 1410b to 1410d may be changed. For example, magnitudes of the residual echo $\hat{D}_r$(κ, m) at a current frame, which are respectively estimated by the residual echo estimators 1410b to 1410d may be respectively calculated by Equation 14 to Equation 16.

$$\left|\hat{D}_r(\kappa, m)\right| = \sum_{i=1}^{M}\sum_{j=1}^{H}\sum_{k=-K}^{K}\delta(i, j, k, m)W_R(i, j, k)|X'(\kappa, i)| + \sum_{t=1}^{T}W_{T1}(t, m)|X'(\kappa-t, m)| + g\left(\sum_{t=1}^{T}W_{T2}(t, m)|\hat{D}_r(\kappa-t, m)|\right) \quad \text{[Equation 14]}$$

$$\left|\hat{D}_r(\kappa, m)\right| = \sum_{i=1}^{M}\sum_{j=1}^{H}\sum_{k=-K}^{K}\delta(i, j, k, m)W_R(i, j, k)|X'(\kappa, i)| + \sum_{t=1}^{T}W_{T1}(t, m)|X'(\kappa-t, m)| + g\left(\sum_{t=0}^{T}W_{T3}(t, m)|Y(\kappa-t, m)|\right) \quad \text{[Equation 15]}$$

$$\left|\hat{D}_r(\kappa, m)\right| = \sum_{i=1}^{M}\sum_{j=1}^{H}\sum_{k=-K}^{K}\delta(i, j, k, m)W_R(i, j, k)|X'(\kappa, i)| + \sum_{t=1}^{T}W_{T1}(t, m)|X'(\kappa-t, m)| + g\left(\sum_{t=1}^{T}W_{T2}(t, m)|\hat{D}_r(\kappa-t, m)| + \sum_{t=0}^{T}W_{T3}(t, m)|Y(\kappa-t, m)|\right) \quad \text{[Equation 16]}$$

In Equation 14 to Equation 16, g(•) is a function associated with the double talk. When the double talk is detected, both magnitudes of the microphone signals Y(κ−t, m) in the current and past frames and magnitudes of the residual echoes $\hat{D}_r$ (κ−t, m) at the past frames may not be used (may be deactivated), and may not be applied to the magnitude of the residual echo $\hat{D}_r(\kappa, m)$ at the current frame. When the double talk is not detected, as described above, the residual echo estimators 1410a to 1410d may estimate the magnitudes of the residual echo $\hat{D}_r(\kappa, m)$ at the current frame calculated by Equation 1 and Equation 11 to Equation 13.

Figure 6:
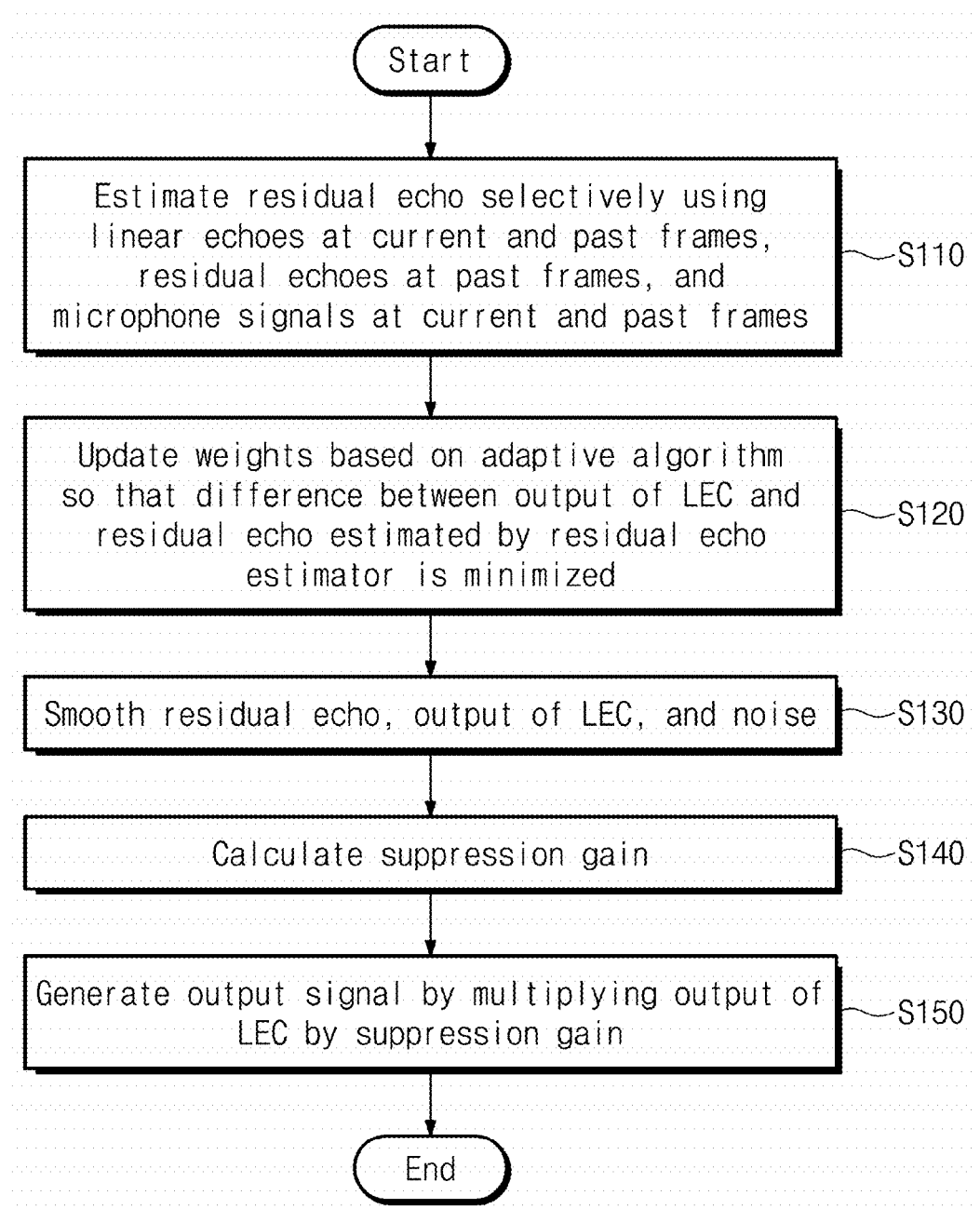
FIG. 6 illustrates a flowchart of estimating a magnitude of a residual echo, according to an example embodiment of the inventive concepts.

FIG. 6 illustrates a flowchart of estimating a magnitude of a residual echo, according to an example embodiment of the inventive concepts. FIG. 6 will be described with reference to FIGS. 1 to 5. In the following description, the residual echo suppressor 1400 may indicate any one of the residual echo suppressors 1400a to 1400d of FIGS. 3A to 3D, and the residual echo estimator 1410 of the residual echo suppressor 1400 may indicate any one of the residual echo estimators 1410a to 1410d of FIGS. 3A to 3D.

Referring to FIGS. 1 to 6, in operation S110, the residual echo estimator 1410 may estimate a magnitude of the residual echo $\hat{D}_r(\kappa, m)$ at a current frame by selectively using magnitudes of the linear echoes $X'(\kappa, m)$ and $X'(\kappa-t, m)$ at current and past frames, magnitudes of the residual echoes $\hat{D}_r(\kappa-t, m)$ at the past frames, and magnitudes of the microphone signals $Y(\kappa, m)$ and $Y(\kappa-t, m)$ at the current and past frames. Operation S110 will be more fully described with reference to FIGS. 7 and 8.

In operation S120, the residual echo estimator 1410 may update at least a part of weights $W_R(i, j, k)$, $W_{T1}(t, m)$, $W_{T2}(t, m)$, and $W_{T3}(t, m)$ selectively used in the estimation of operation S110 so that a difference between the magnitude of the output signal $E(\kappa, m)$ of the linear echo canceler 1300 and the magnitude of the residual echo $\hat{D}_r(\kappa, m)$ is minimized. Equation 17 indicates the above difference.

$$\xi(\kappa,m)=E(\kappa,m)-\hat{D}_r(\kappa,m) \qquad \text{[Equation 17]}$$

The residual echo estimator 1410 may update at least a part of the weights $W_R(i, j, k)$, $W_{T1}(t, m)$, $W_{T2}(t, m)$, and $W_{T3}(t, m)$ selectively used in the estimation of operation S110 by using the difference of Equation 17. The residual echo estimator 1410 may use a normalized least mean square (NLMS), a recursive least square (RLS), or a Kalman filter, etc. for optimizing the weights $W_R(i, j, k)$, $W_{T1}(t, m)$, $W_{T2}(t, m)$, and $W_{T3}(t, m)$. For example, in the case where the NLMS is used, the weights $W_R(i, j, k)$, $W_{T1}(t, m)$, $W_{T2}(t, m)$, and $W_{T3}(t, m)$ may be optimized as represented as Equation 18. In Equation 18, weights may be updated in the direction of an arrow, and $P_1$, $P_2$, and $P_3$ may be power smoothings of the linear echo $X'(\kappa, m)$, the residual echo $\hat{D}_r(\kappa, m)$, and the microphone signal $Y(\kappa, m)$.

$$W_R(i, j, k) \leftarrow W_R(i, j, k) + \frac{\mu}{P_1(\kappa, m)}|X'(\kappa, m)|\xi(\kappa, m),$$

$$W_{T1}(\kappa - t, m) \leftarrow W_{T1}(\kappa - t, m) + \frac{\mu}{P_1(\kappa, m)}|X'(\kappa - t, m)|\xi(\kappa, m),$$

for $1 \leq t \leq T$, $$W_{T2}(\kappa - t, m) \leftarrow W_{T2}(\kappa - t, m) + \frac{\mu}{P_2(\kappa, m)}|\hat{D}_r(\kappa - t, m)|\xi(\kappa, m),$$

for $1 \leq t \leq T$, $$W_{T3}(\kappa - t, m) \leftarrow W_{T3}(\kappa - t, m) + \frac{\mu}{P_3(\kappa, m)}|Y(\kappa - t, m)|\xi(\kappa, m),$$

for $0 \leq t \leq T$

[Equation 18]

For another example, in the case where the RLS is used, the weights $W_R(i, j, k)$, $W_{T1}(t, m)$, $W_{T2}(t, m)$, and $W_{T3}(t, m)$ may be optimized as represented as Equation 19 to Equation 21. In Equation 19, weights may be updated in the direction of an arrow.

$$W_R(i, j, k) \leftarrow W_R(i, j, k) + k_1(\kappa, m)\xi(\kappa, m),$$

$$W_{T1}(\kappa - t, m) \leftarrow W_{T1}(\kappa - t, m) + k_2(\kappa, m)\xi(\kappa, m),$$

for $1 \leq t \leq T$, $$W_{T2}(\kappa - t, m) \leftarrow W_{T2}(\kappa - t, m) + k_3(\kappa, m)\xi(\kappa, m),$$

for $1 \leq t \leq T$, $$W_{T3}(\kappa - t, m) \leftarrow W_{T3}(\kappa - t, m) + k_4(\kappa, m)\xi(\kappa, m),$$

for $0 \leq t \leq T$

[Equation 19]

$$k_1(\kappa, m) = \frac{B_1(\kappa - 1, m)|X'(\kappa, m)|}{\lambda + B_1(\kappa - 1, m)|X'(\kappa, m)|^2},$$

for $1 \leq t \leq T$, $$k_2(\kappa, m) = \frac{B_2(\kappa - 1, m)|X'(\kappa - t, m)|}{\lambda + B_2(\kappa - 1, m)|X'(\kappa - t, m)|^2},$$

for $1 \leq t \leq T$, $$k_3(\kappa, m) = \frac{B_3(\kappa - 1, m)|X'(\kappa, m)|}{\lambda + B_3(\kappa - 1, m)|X'(\kappa, m)|^2},$$

for $1 \leq t \leq T$, $$k_4(\kappa, m) = \frac{B_4(\kappa - 1, m)|X'(\kappa, m)|}{\lambda + B_4(\kappa - 1, m)|X'(\kappa, m)|^2},$$

for $0 \leq t \leq T$

[Equation 20]

$$B_1(\kappa, m) = \frac{1}{\lambda}(B_1(\kappa - 1, m) - k_1(\kappa, m)|X'(\kappa, m)|B_1(\kappa - 1, m)),$$

$$B_2(\kappa, m) = \frac{1}{\lambda}(B_2(\kappa - 1, m) - k_2(\kappa, m)|X'(\kappa - t, m)|B_2(\kappa - 1, m)),$$

for $1 \leq t \leq T$, $$B_3(\kappa, m) = \frac{1}{\lambda}(B_3(\kappa - 1, m) - k_3(\kappa, m)|\hat{D}_r(\kappa - t, m)|B_3(\kappa - 1, m)),$$

for $1 \leq t \leq T$, $$B_4(\kappa, m) = \frac{1}{\lambda}(B_4(\kappa - 1, m) - k_4(\kappa, m)|Y(\kappa - t, m)|B_4(\kappa - 1, m)),$$

for $0 \leq t \leq T$

[Equation 21]

In an example embodiment, the residual echo estimator 1410 may execute an artificial neural network that updates the weights $W_R(i, j, k)$, $W_{T1}(t, m)$, $W_{T2}(t, m)$, and $W_{T3}(t, m)$ used so that a difference between the magnitude of the output signal $E(\kappa, m)$ of the linear echo canceler 1300 and the magnitude of the residual echo $\hat{D}_r(\kappa, m)$ is reduced (or, alternatively, minimized). The artificial neural network may learn the weights $W_R(i, j, k)$, $W_{T1}(t, m)$, $W_{T2}(t, m)$, and $W_{T3}(t, m)$ based on the above adaptive algorithm so that the above difference is minimized. Because a magnitude of the output signal $E(\kappa, m)$ of the linear echo canceler 1300 indicates a magnitude of an actual residual echo, an ideal value of the difference may be, for example, "0".

In operation S130, the first to third smoothing calculators 1431 to 1433 may respectively execute smoothing operations on the magnitude of the residual echo $\hat{D}_r(\kappa, m)$, the magnitude of the output signal $E(\kappa, m)$ of the linear echo canceler 1300, and the magnitude of the noise $N(\kappa, m)$.

In operation S140, the gain calculator 1440 may calculate the suppression gain $G(\kappa, m)$, which is multiplied with the output signal $E(\kappa, m)$ of the linear echo canceler 1300, by using a residual echo, an output signal of the linear echo canceler 1300, and smoothed magnitudes of a noise.

In operation S150, the multiplier 1450 may generate the output signal R(κ, m) by multiplying the output signal E(κ, m) of the linear echo canceler 1300 and the suppression gain G(κ, m) together.

Figure 7:
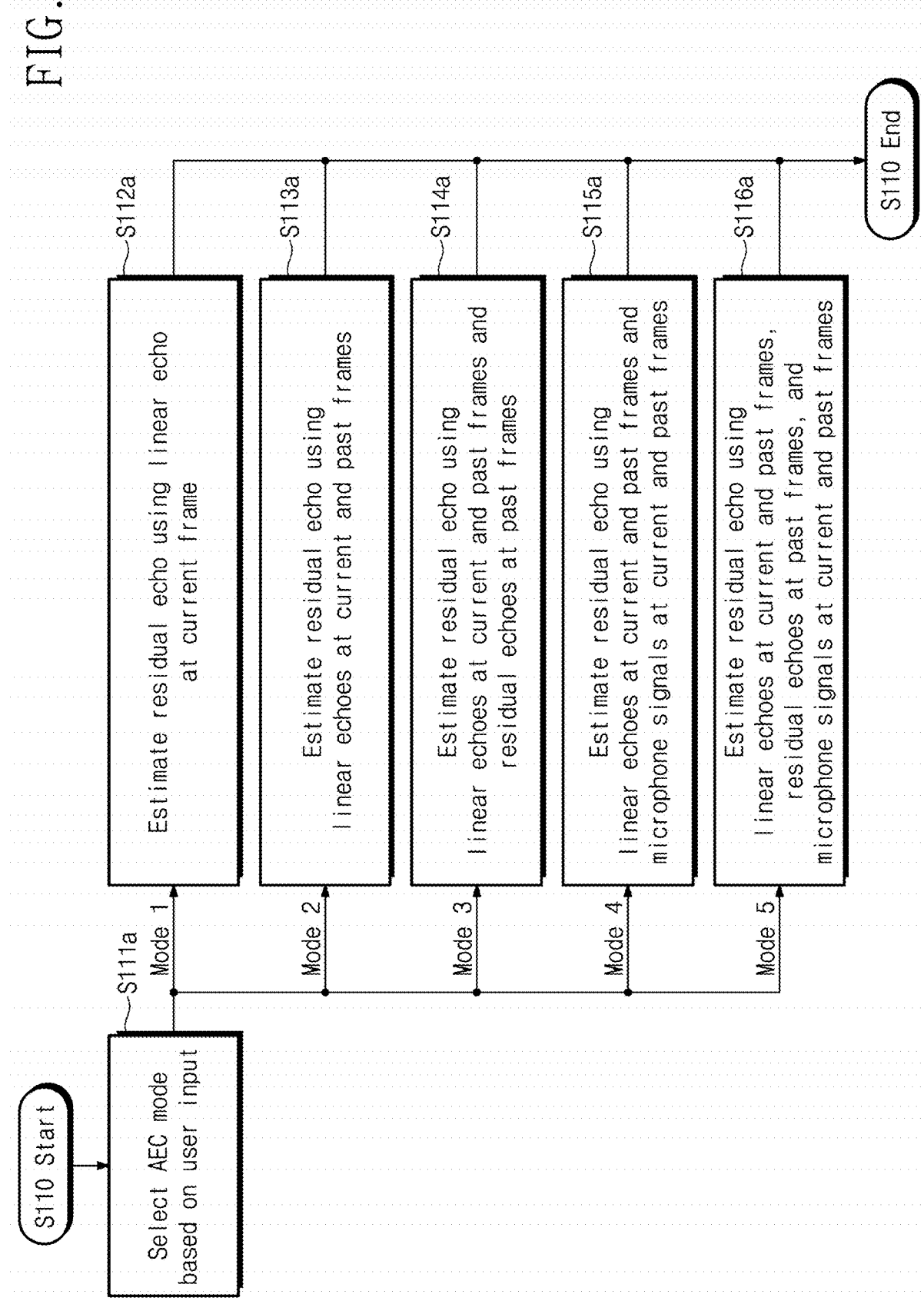
FIG. 7 illustrates detailed operations associated with operation S110 of FIG. 6 according to an example embodiment of the inventive concepts.

FIG. 7 illustrates detailed operations associated with operation S110 of FIG. 6 according to an example embodiment of the inventive concepts.

Referring to FIGS. 6 and 7, in operation S111a, the residual echo estimator 1410 may select an acoustic echo cancellation (AEC) mode based on a user input. For example, the user may represent various objects such as a user of the electronic device 10, an operating system (OS) that the application processor 100 supports, an application program, a far-end speaker, and a near-end speaker. For example, the residual echo estimator 1410 may support five (5) AEC modes. Of course, the number of AEC modes is not limited to the above description.

In the case where a first mode is selected, in operation S112a, the residual echo estimator 1410 may estimate a magnitude of the residual echo r (κ, m) by using only a magnitude of the linear echo X'(κ, m) at (or, alternatively, of) a current frame. The first mode may be a default mode, in which a time correlation of a linear echo, a time correlation of a residual echo, and a time correlation of a microphone signal may not be used to estimate a magnitude of the residual echo $\hat{D}_r$(κ, m).

In the case where a second mode is selected, in operation S113a, the residual echo estimator 1410 may estimate the magnitude of the residual echo $\hat{D}_r$ (κ, m) by further using magnitudes of the linear echoes X'(κ−t, m) at past frames in addition to the magnitude of the linear echo X'(κ, m) at the current frame (refer to the residual echo estimator 1410a of FIG. 3A). As illustrated in FIG. 3A, when the second mode is selected, a time correlation of a linear echo may be further used to estimate the magnitude of the residual echo $\hat{D}_r$(κ, m). Accordingly, the degree to which the ERLE of the AEC system 1000 when the second mode is selected is improved may be greater than the degree to which the ERLE of the AEC system 1000 when the first mode is selected is improved.

In the case where a third mode is selected, in operation S114a, the residual echo estimator 1410 may estimate the magnitude of the residual echo $\hat{D}_r$(κ, m) by further using the magnitudes of the linear echoes X'(κ−t, m) at the past frames and magnitudes of the linear echoes $\hat{D}_r$(κ−t, m) at the past frames in addition to the magnitude of the linear echo X'(κ, m) at the current frame (refer to the residual echo estimator 1410b of FIG. 3B). As illustrated in FIG. 3B, when the third mode is selected, a time correlation of a linear echo and a time correlation of a residual echo $\hat{D}_r$ (κ, m) may be further used to estimate the magnitude of the residual echo $\hat{D}_r$ (κ, m). Accordingly, the degree to which the ERLE of the AEC system 1000 when the third mode is selected is improved may be greater than the degree to which the ERLE of the AEC system 1000 when the first or second mode is selected is improved.

In the case where a fourth mode is selected, in operation S115a, the residual echo estimator 1410 may estimate the magnitude of the residual echo $\hat{D}_r$(κ, m) by further using the magnitudes of the linear echoes X'(κ−t, m) at the past frames and magnitudes of the microphone signals Y(κ, m) and Y(κ−t, m) at the current and past frames in addition to the magnitude of the linear echo X'(κ, m) at the current frame (refer to the residual echo estimator 1410c of FIG. 3C). As illustrated in FIG. 3C, when the fourth mode is selected, a time correlation of a linear echo and a time correlation of a microphone signal may be further used to estimate the magnitude of the residual echo $\hat{D}_r$(κ, m). Accordingly, the degree to which the ERLE of the AEC system 1000 when the fourth mode is selected is improved may be greater than the degree to which the ERLE of the AEC system 1000 when the first or second mode is selected is improved.

In the case where a fifth mode is selected, in operation S116a, the residual echo estimator 1410 may estimate the magnitude of the residual echo $\hat{D}_r$(κ, m) by further using the magnitudes of the linear echoes X'(κ−t, m) at the past frames, the magnitudes of the residual echoes $\hat{D}_r$(κ−t, m) at the past frames, and the magnitudes of the microphone signals Y(κ, m) and Y(κ−t, m) at the current and past frames in addition to the magnitude of the linear echo X'(κ, m) of the current frame (refer to the residual echo estimator 1410d of FIG. 3D). As illustrated in FIG. 3D, when the fifth mode is selected, a time correlation of a linear echo, a time correlation of a residual echo, and a time correlation of a microphone signal may be further used to estimate the magnitude of the residual echo $\hat{D}_r$ (κ, m). Accordingly, the degree to which the ERLE of the AEC system 1000 when the fifth mode is selected is improved may be greater than the degree to which the ERLE of the AEC system 1000 when the first or fourth mode is selected is improved.

However, the amount of operations that are necessary to update weights and estimate a magnitude of a residual echo when one of the second to fifth modes is selected may increase compared with the amount of operations when the first mode is selected. Accordingly, the user may appropriately select any one of the first to fifth modes in consideration of the ERLE and a hardware resource of the electronic device 10.

Figure 8:
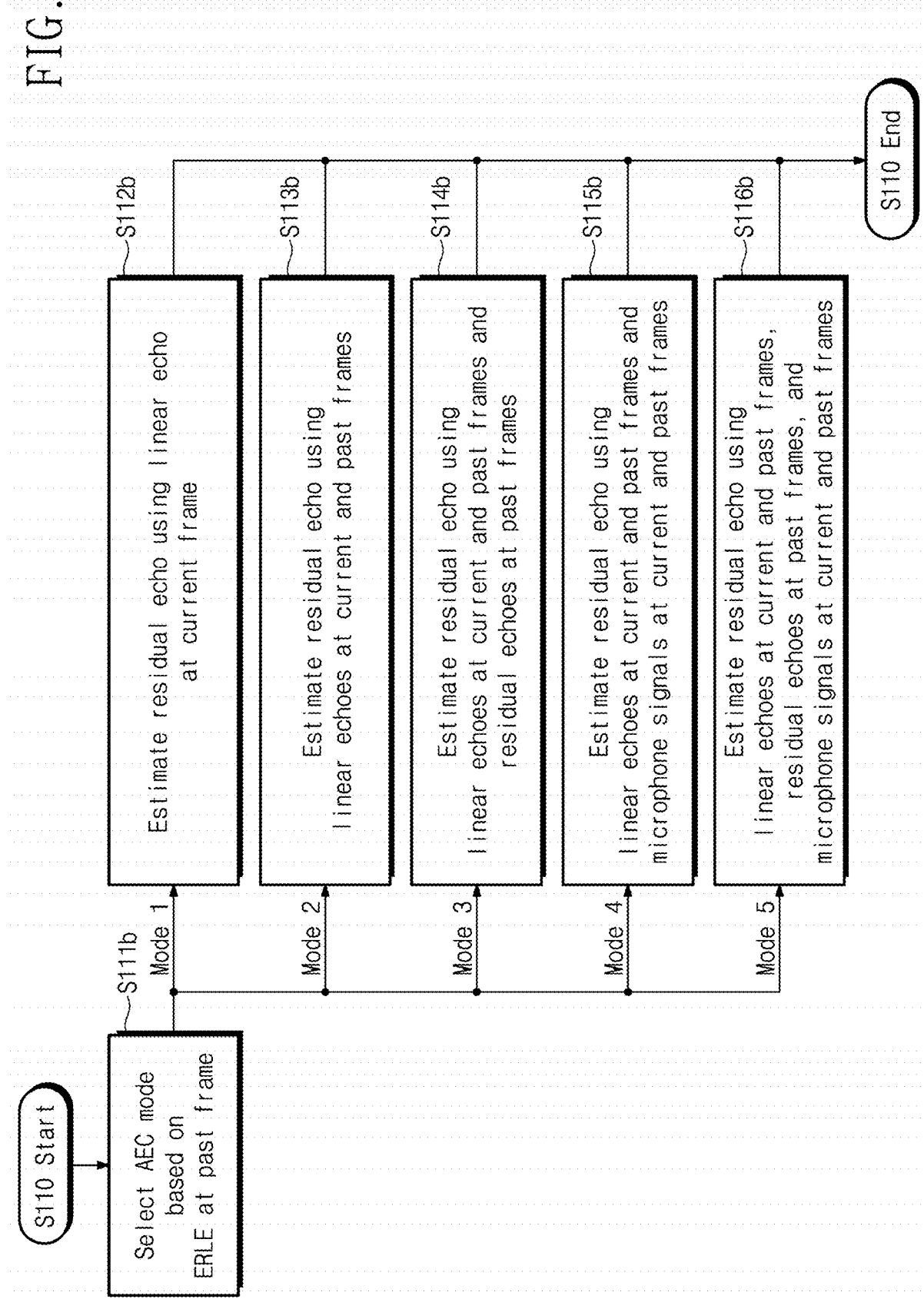
FIG. 8 illustrates detailed operations associated with operation S110 of FIG. 6 according to another example embodiment of the inventive concepts.

FIG. 8 illustrates detailed operations associated with operation S110 of FIG. 6 according to another example embodiment of the inventive concepts.

In operation S111b, the residual echo suppressor 1400 may select an AEC mode based on an echo return loss enhancement (ERLE) at a past frame. The residual echo suppressor 1400 may estimate a magnitude of a residual echo at a past frame according to a mode previously selected among the first to fifth modes and may evaluate the ERLE. The residual echo suppressor 1400 may compare the ERLE with a reference value and may change the previously selected mode to other mode. For example, when the ERLE does not reach the reference value, the residual echo suppressor 1400 may select any one of the second to fifth modes in which a higher ERLE may be expected. For another example, when the ERLE is considerably greater than the reference value, the residual echo suppressor 1400 may select any one of the second to fifth modes for reducing the amount of operations. Operation Si12b to operation S116b are substantially the same as operation S112a to operation S116a of FIG. 7.

Figure 9:
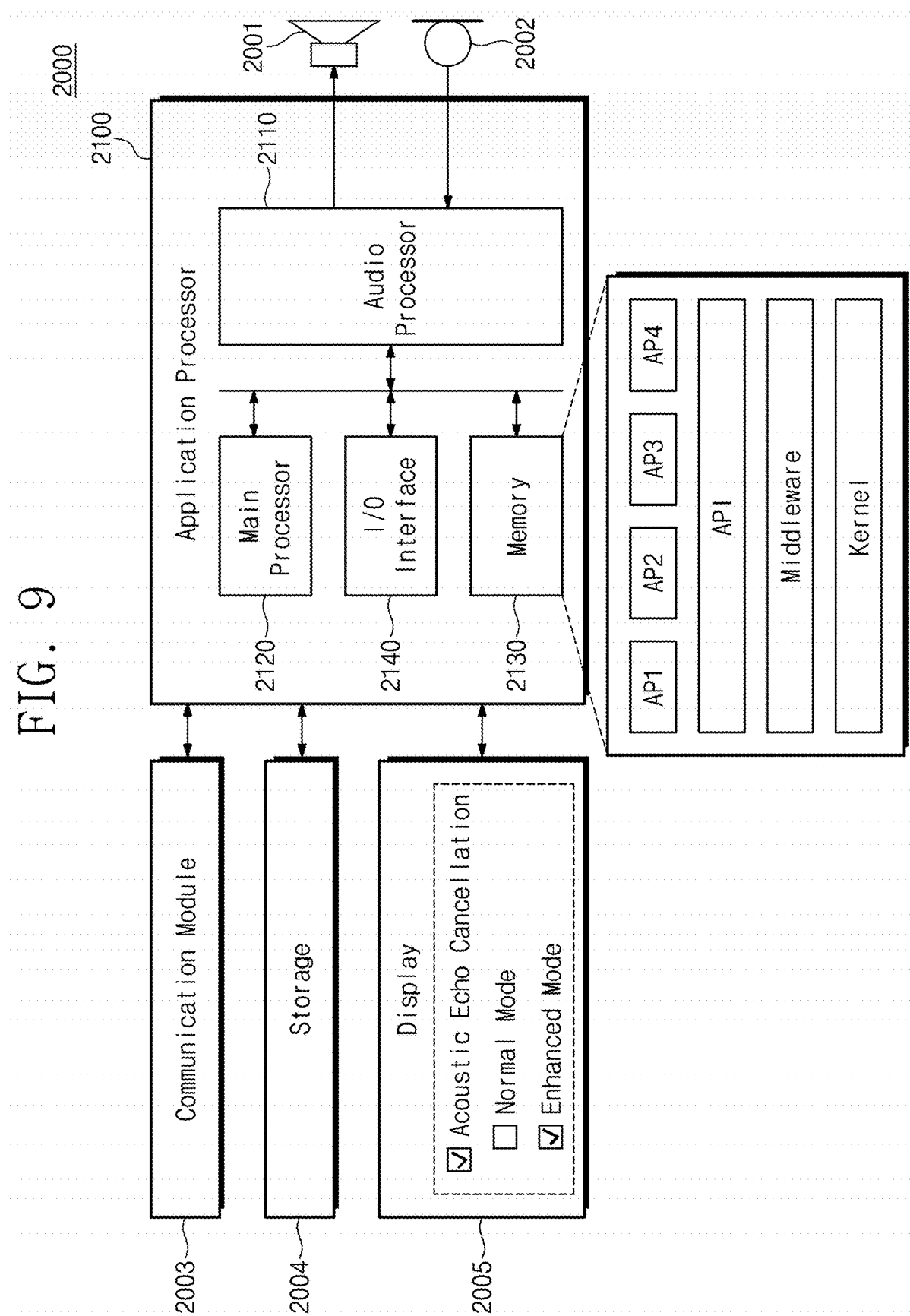
FIG. 9 illustrates an electronic device according to an example embodiment of the inventive concepts.

FIG. 9 illustrates an electronic device according to an example embodiment of the inventive concepts.

Referring to FIG. 9, an electronic device 2000 may be the electronic device 10 illustrated in FIG. 1. The electronic device 2000 may be implemented with a data processing device that may use or support interfaces proposed by mobile industry processor interface (MIPI) alliance. For example, the electronic device 2000 may be a digital camera, a video camcorder, a smartphone, a tablet, a wearable device (e.g., a smart watch or a smart band), a smart speaker, an artificial intelligence based voice recognition device, a medical device, a navigation device, home appliances, etc. The electronic device 2000 may be used for a mobile communication, a conference call, etc. The electronic device 2000 may include any device including both a speaker 2001 and a microphone 2002.

The speaker 2001 and the microphone 2002 may be included to process voice information of the electronic device 2000. The speaker 2001 and the microphone 2002 may be the speaker 11 and the microphone 12 described with reference to FIG. 1.

The electronic device 2000 may communicate with an external system or an external device (e.g., the electronic device 20 of FIG. 1) through a communication module 2003. The communication module 2003 may support at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID). The communication module 2003 may be embedded in an application processor 2100.

The electronic device 2000 may include storage 2004. The storage 2004 may correspond to the memory 200 described with reference to FIG. 4 or a secondary memory implemented independently of the memory 200, and data stored in the memory 200 may be backed up to the storage 2004. The storage 2004 may store or back up the weights $W_R(i, j, k)$, $W_{T1}(t, m)$, $W_{T2}(t, m)$, and $W_{T3}(t, m)$ described above and a program code for executing the AEC system 1000, regardless of whether a power is supplied. The storage 2004 may include a nonvolatile memory. The storage 2004 may be a device such as a secure digital (SD) card or an embedded multimedia card (eMMC).

A display 2005 of the electronic device 2000 may perform an interface with the user under control of the application processor 2100. For example, the user may activate the above-described AEC system 1000 through the display 2005. In detail, the user may activate the AEC system 1000 and may select one of modes (the first to fifth modes of FIGS. 7 and 8) that the AEC system 1000 supports (refer to operation S111a and operation S111b). For example, in the case where the user selects the normal mode, the AEC system 1000 may estimate a magnitude of a residual echo based on the first mode. For another example, in the case where the user selects an enhanced mode, the AEC system 1000 may estimate a magnitude of a residual echo based on any one of the second to fifth modes. Of course, the user may select any one of modes of the AEC system 1000 through any other input/output manner of the electronic device 2000 as well as the display 2005.

The application processor 2100 may control overall operations of the electronic device 2000. The application processor 2100 may be implemented in the form of a system-on-chip (SoC). The application processor 2100 may include an audio processor 2110, a main processor 2120, a memory 2130, and an input/output interface 2140. The audio processor 2110 may be the audio processor 110 described above, and the memory 2130 may be the memory 120 described above.

The main processor 2120 may control overall operations of the application processor 2110 independently of the audio processor 2110. The main processor 2120 may load and execute a variety of software (e.g., an application program, an operating system, and a device driver), which the application processor 2100 supports, onto the memory 2130. The main processor 2120 may include one or more central processing units or one or more graphics processing units, that is, one or more cores.

Software, a program, or a program code executable by the main processor 2120 may be loaded onto the memory 2130. For example, the program or the program code may include a kernel, middleware, an application programming interface (API), and application programs AP1 to AP4. At least a portion of the kernel, the middleware, and the API may be called an "OS". The kernel may manage a resource (e.g., the memory 2130 or the storage 2004) used to execute operations or functions by any other programs (e.g., the middleware, the API, and the application programs AP1 to AP4). The middleware may perform a mediation role for exchanging data between the API or application programs API to AP4 and the kernel. The API may be an interface that is used for the application programs API to AP4 to control a function provided from the kernel or the middleware.

The number of the application programs API to AP4 is not limited to illustration of FIG. 9. As described above, a program code for executing the AEC system 1000 may be stored in the memory 2130, and the AEC system 1000 may be loaded and executed onto the memory 2130. For example, any one associated with voice communication among the application programs API to AP4 may select any one of modes (the first to fifth modes of FIGS. 7 and 8) that the AEC system 1000 supports (refer to operation S111a). A program code capable of selecting modes that the AEC system 1000 selects may be the same as or different from a program code for executing the AEC system 1000.

The input/output interface 2140 may perform an interface operation for data exchange between the application processor 2100 and any other components of the electronic device 2000. For example, data stored in the memory 2130 may be transmitted or backup up through the input/output interface 2140.

According to an example embodiment of the inventive concepts, a time correlation of a linear echo, a time correlation of a residual echo, and a time correlation of a microphone signal may be selectively used to calculate a magnitude of a residual echo. Accordingly, an ERLE of an AEC system may be further improved.

While example embodiments of the inventive concepts have been described with reference to some example embodiments thereof, it will be apparent to those of ordinary skill in the art that various changes and modifications may be made thereto without departing from the spirit and scope of the inventive concepts as set forth in the following claims.

What is claimed is:

1. A residual echo estimator configured to estimate a residual echo of a microphone signal, the residual echo estimator comprising:
   processing circuitry configured to,
      estimate a magnitude of the residual echo at a current frame based on a magnitude of a linear echo of a reference signal at the current frame and a magnitude of the linear echo of the reference signal at a past frame, and
      update weights to apply to the magnitude of the linear echo at the current frame and the magnitude of the linear echo at the past frame.

2. The residual echo estimator of claim 1, wherein the processing circuitry is configured to,
   estimate the magnitude of the residual echo at the current frame further based on a magnitude of the microphone signal at the current frame and a magnitude of the microphone signal at the past frame, and
   further update weights to apply to the magnitude of the microphone signal at the current frame and the magnitude of the microphone signal at the past frame.

3. The residual echo estimator of claim 1, wherein the processing circuitry is configured to,
estimate the magnitude of the residual echo at the current frame further based on a magnitude of the residual echo at the past frame, and
further update a weight to apply to the magnitude of the residual echo at the past frame.

4. The residual echo estimator of claim 1, wherein the processing circuitry is configured to,
update the weights based on a difference between an actual magnitude of the residual echo and the magnitude of the residual echo.

5. The residual echo estimator of claim 1, wherein the magnitude of the residual echo is a value obtained by,
multiplying the magnitude of the linear echo at the current frame by the weights associated therewith to generate a first value,
multiplying the magnitude of the linear echo at the past frame by the weights associated therewith to generate a second value, and
adding the first value and the second value to generate the value of the magnitude of the residual echo.

6. A non-transitory computer-readable medium comprising a program code executable by a processor to,
estimate a magnitude of a residual echo of a microphone signal at a current frame based on a magnitude of a linear echo of a reference signal at the current frame and a magnitude of the linear echo of the reference signal at a past frame,
update weights to apply to the magnitude of the linear echo at the current frame and the magnitude of the linear echo at the past frame, and
calculate a suppression gain based on the magnitude of the residual echo and a magnitude of an output signal obtained by canceling the linear echo from the microphone signal, the output signal being multiplied by the suppression gain to generate a final output signal.

7. The non-transitory computer-readable medium of claim 6, wherein the program code, when executed, configures the processor to,
store the magnitude of the linear echo of the reference signal at the past frame in a memory, the memory being a tightly coupled memory (TCM), a static random access memory (SRAM), or a dynamic random access memory (DRAM).

8. The non-transitory computer-readable medium of claim 6, wherein the program code, when executed, configures the processor to,
estimate the magnitude of the residual echo at the current frame further based on a magnitude of the microphone signal at the current frame and a magnitude of the microphone signal at the past frame, and
further update weights to apply to the magnitude of the microphone signal at the current frame and the magnitude of the microphone signal at the past frame.

9. The non-transitory computer-readable medium of claim 6, wherein the program code, when executed, configures the processor to,
estimate the magnitude of the residual echo at the current frame further based on a magnitude of the residual echo at the past frame, and
further update a weight to apply to the magnitude of the residual echo at the past frame.

10. The non-transitory computer-readable medium of claim 6, wherein the program code, when executed, configures the processor to,
update the weights based on a difference between the magnitude of the output signal and the magnitude of the residual echo.

11. The non-transitory computer-readable medium of claim 6, wherein the program code, when executed, configures the processor to,
execute an artificial neural network that updates the weights so that a difference between the magnitude of the output signal and the magnitude of the residual echo is reduced.

12. The non-transitory computer-readable medium of claim 6, wherein the program code, when executed, configures the processor to,
execute a noise estimator that estimates a magnitude of a noise by using the magnitude of the output signal, and
calculate the suppression gain further based on the magnitude of the noise.

13. The non-transitory computer-readable medium of claim 6, wherein the program code, when executed, configures the processor to,
execute a smoothing calculator that smoothes the magnitude of the residual echo and the magnitude of the output signal to generate a smoothed magnitude of the residual echo and a smoothed magnitude of the output signal, respectively, and
calculate the suppression gain based on the smoothed magnitude of the residual echo and the smoothed magnitude of the output signal.

14. An application processor comprising:
an audio processor; and
a non-transitory computer-readable medium configured to store a program code executable by the audio processor to,
generate an output signal by canceling a linear echo of a reference signal from a microphone signal input to a microphone as the reference signal is output from a speaker, the linear echo being determined based on a transfer path between the speaker and the microphone,
estimate a magnitude of a residual echo at a current frame based on one or more of a magnitude of the linear echo at the current frame and a magnitude of the linear echo at a past frame, and
update weights to apply to the magnitude of the linear echo at the current frame and the magnitude of the linear echo at the past frame so that a difference between a magnitude of the output signal and the magnitude of the residual echo is reduced.

15. The application processor of claim 14, wherein the program code, when executed, configures the audio processor to,
estimate, in a first mode, the magnitude of the residual echo of the current frame based on the magnitude of the linear echo at the current frame and not the magnitude of the linear echo at the past frame,
estimate, in a second mode, the magnitude of the residual echo of the current frame based on the magnitude of the linear echo at the current frame and the magnitude of the linear echo at the past frame.

16. The application processor of claim 14, wherein the program code is a first program code, and the non-transitory computer-readable medium further stores a second program code, and the application processor further comprises:
a main processor configured to execute the second program code to determine whether the magnitude of the linear echo at the past frame is used to estimate the magnitude of the residual echo of the current frame.

17. The application processor of claim 14, wherein the program code, when executed, configures the audio processor to,
- calculate a suppression gain based on the magnitude of the residual echo and the magnitude of the output signal, and
- generates a final output signal by multiplying the output signal and the suppression gain.

18. The application processor of claim 14, wherein the program code, when executed, configures the audio processor to,
- detect whether a double talk is present, and
- estimate the magnitude of the residual echo at the current frame further based on a magnitude of the residual echo at the past frame and a magnitude of the microphone signal at the current frame and a magnitude of the microphone signal at the past frame, in response to the audio processor not detecting the double talk.

19. The application processor of claim 14, wherein the program code, when executed, configures the audio processor to,
- store the magnitude of the linear echo of the reference signal at the past frame in a memory, the memory being a tightly coupled memory (TCM), a static random access memory (SRAM), or a dynamic random access memory (DRAM).

* * * * *